United States Patent
Zirwas et al.

(10) Patent No.: US 11,627,020 B2
(45) Date of Patent: Apr. 11, 2023

(54) MULTIPLE CHANNEL CSI RECREATION

(71) Applicant: NOKIA TECHNOLOGIES OY, Espoo (FI)

(72) Inventors: Wolfgang Zirwas, Munich (DE); Brenda Vilas Boas, Munich (DE); Athul Prasad, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/943,881

(22) Filed: Sep. 13, 2022

(65) Prior Publication Data
US 2023/0085270 A1    Mar. 16, 2023

(30) Foreign Application Priority Data
Sep. 13, 2021 (FI) ................................. 20215959

(51) Int. Cl.
     H04L 25/02 (2006.01)
(52) U.S. Cl.
     CPC ................. *H04L 25/0254* (2013.01)
(58) Field of Classification Search
     CPC .................................................. H04L 25/0254
     See application file for complete search history.

(56) References Cited

U.S. PATENT DOCUMENTS

| | | |
|---|---|---|
| 2020/0366385 A1 | 11/2020 | Ge et al. |
| 2021/0119713 A1 | 4/2021 | O'Shea et al. |
| 2021/0273707 A1 | 9/2021 | Yoo et al. |

FOREIGN PATENT DOCUMENTS

| | | |
|---|---|---|
| WO | 2019/138156 A1 | 7/2019 |
| WO | 2021/001032 A1 | 1/2021 |
| WO | 2021/029889 A1 | 2/2021 |
| WO | 2021/041862 A1 | 3/2021 |

OTHER PUBLICATIONS

Communication of Acceptance—section 29 a of Patents Decree dated Mar. 24, 2022 with Finnish Search Report corresponding to Finnish Patent Application No. 20215959.
Extended European Search Report dated Jan. 19, 2023 corresponding to European Patent Application No. 22194339.2.
(Continued)

*Primary Examiner* — Natasha W Cosme
(74) *Attorney, Agent, or Firm* — Squire Patton Boggs (US) LLP

(57) ABSTRACT

Method, comprising receiving a terminal location information or a location-like information from a terminal; selecting one or more first pairs of prior channel information among one or more stored first pairs of prior channel information based on the terminal location information or the location-like information, respectively; inputting the terminal location information or the location-like information, respectively, and the selected one or more first pairs of prior channel information into a trained interpolation neural network to obtain a first estimation of a channel between the terminal and a base station as an output from the interpolation neural network; providing the weights of the trained neural network to the terminal; wherein each of the one or more first pairs of prior channel information comprises a location information related to a respective prior channel and a first representation of the respective prior channel.

15 Claims, 19 Drawing Sheets

(56) References Cited

OTHER PUBLICATIONS

Ruichen Deng et al., "A Two-Step Learning and Interpolation Method for Location-Based Channel Database Construction," 2018 IEEE Global Communications Conference (Globecom), IEEE, Dec. 9, 2018, pp. 1-6, XP033519556.

Lorenzo Cazzella et al., "Deep Learning of Transferable MIMO Channel Modes for 6G V2X Communications," arxiv.org, Aug. 31, 2021, XP091041154.

Brenda Vilas Boas et al., "Machine Learning for CSI Recreation Based on Prior Knowledge," arxiv.org, Nov. 15, 2021, XP091098283.

Information bottleneck method
(variational autoencoder)
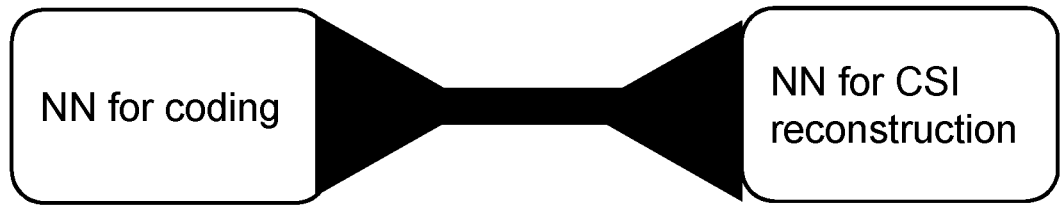
how to minimize
information bottleneck?
Fig. 1

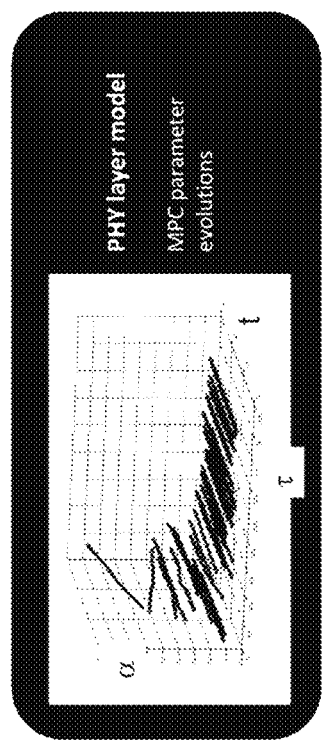
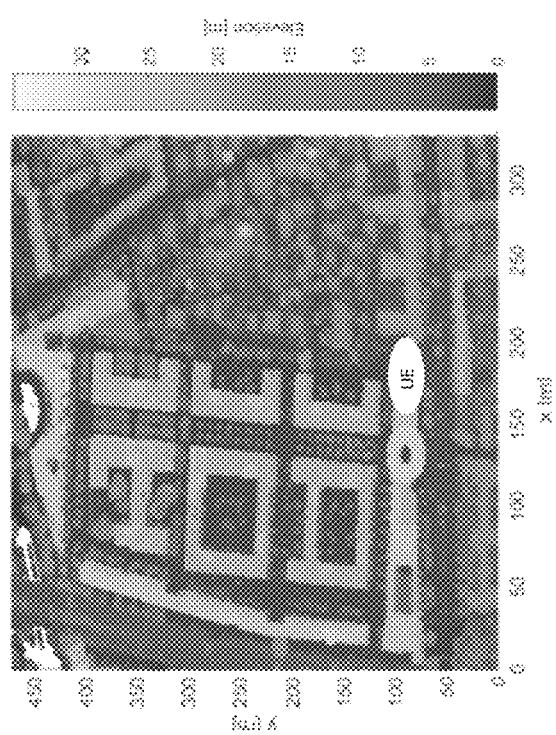
Fig. 7

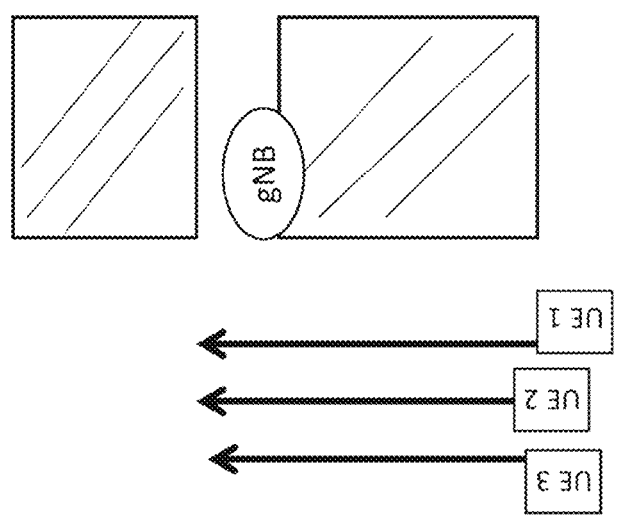
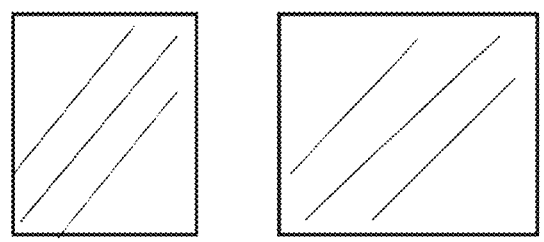
Fig. 9

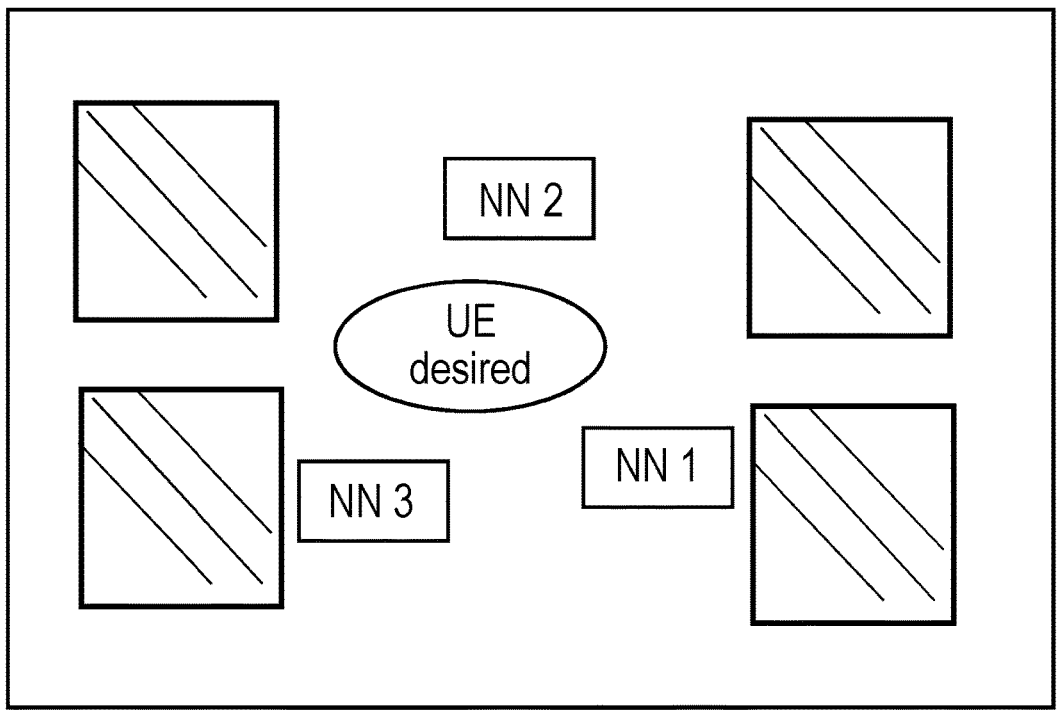
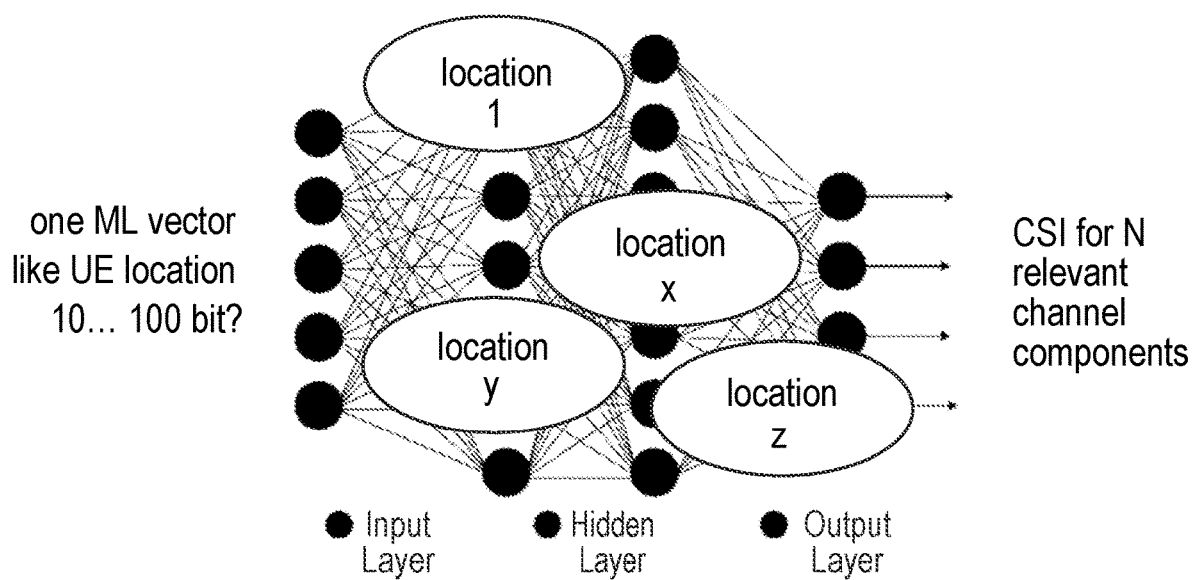
Fig. 15

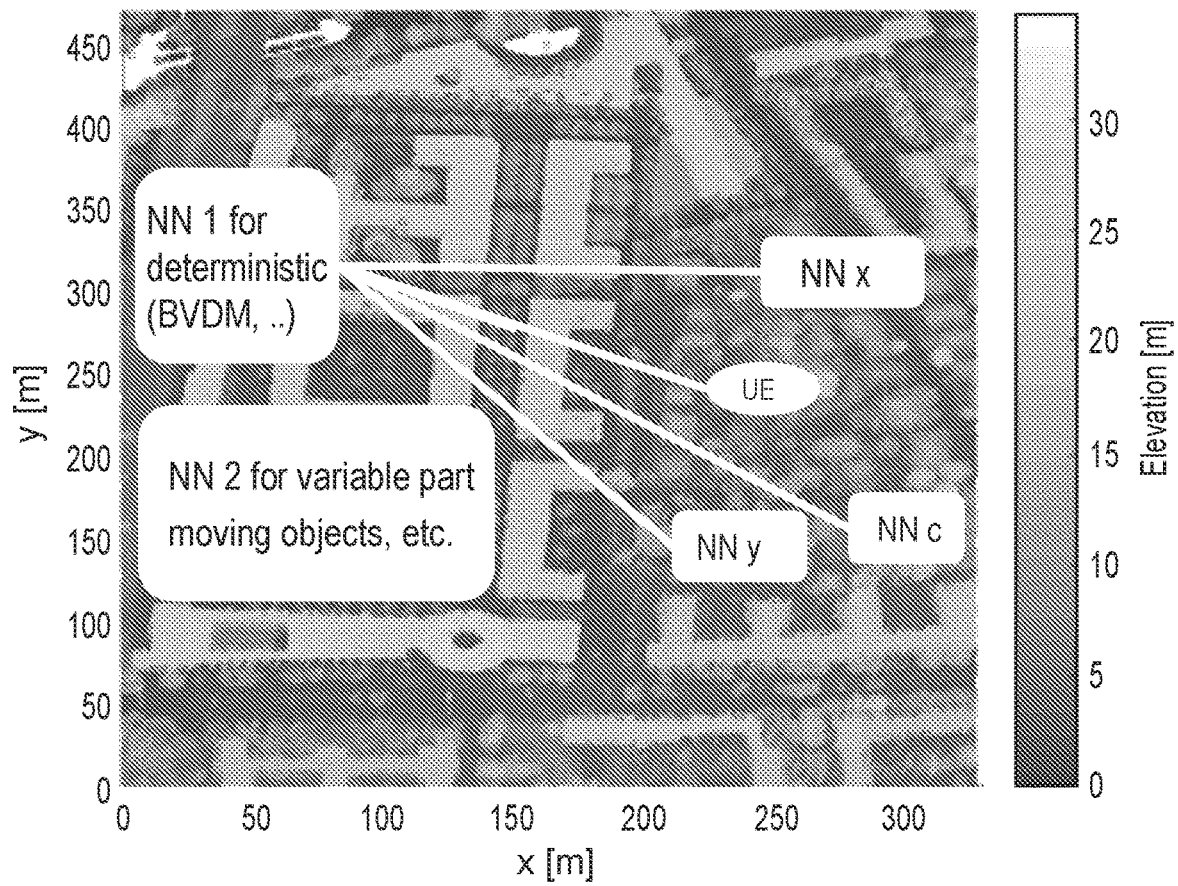
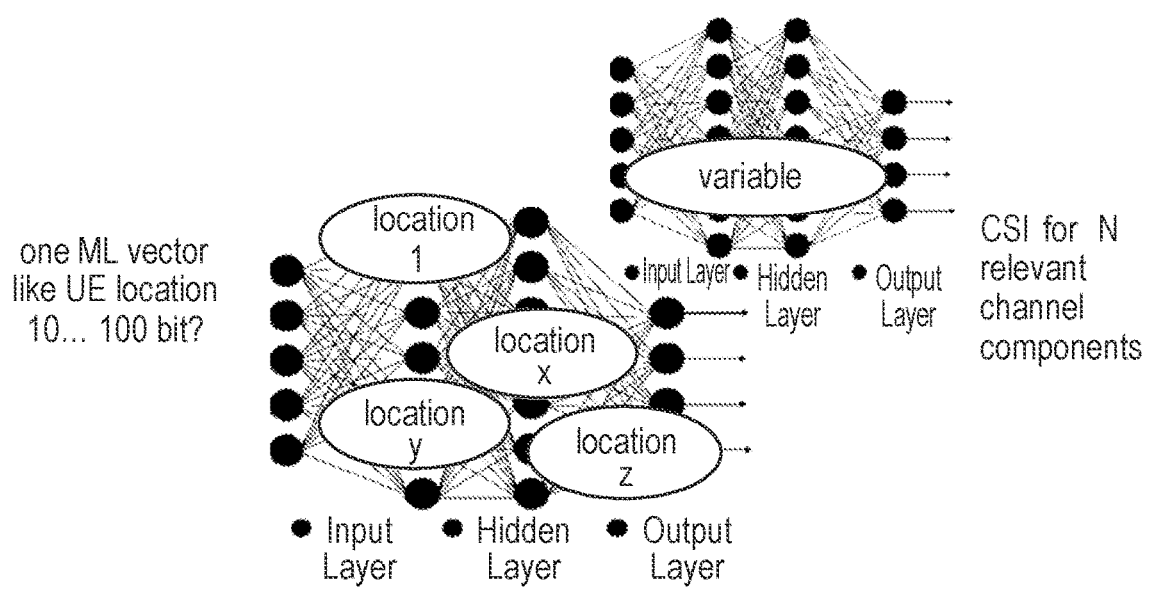
Fig. 16

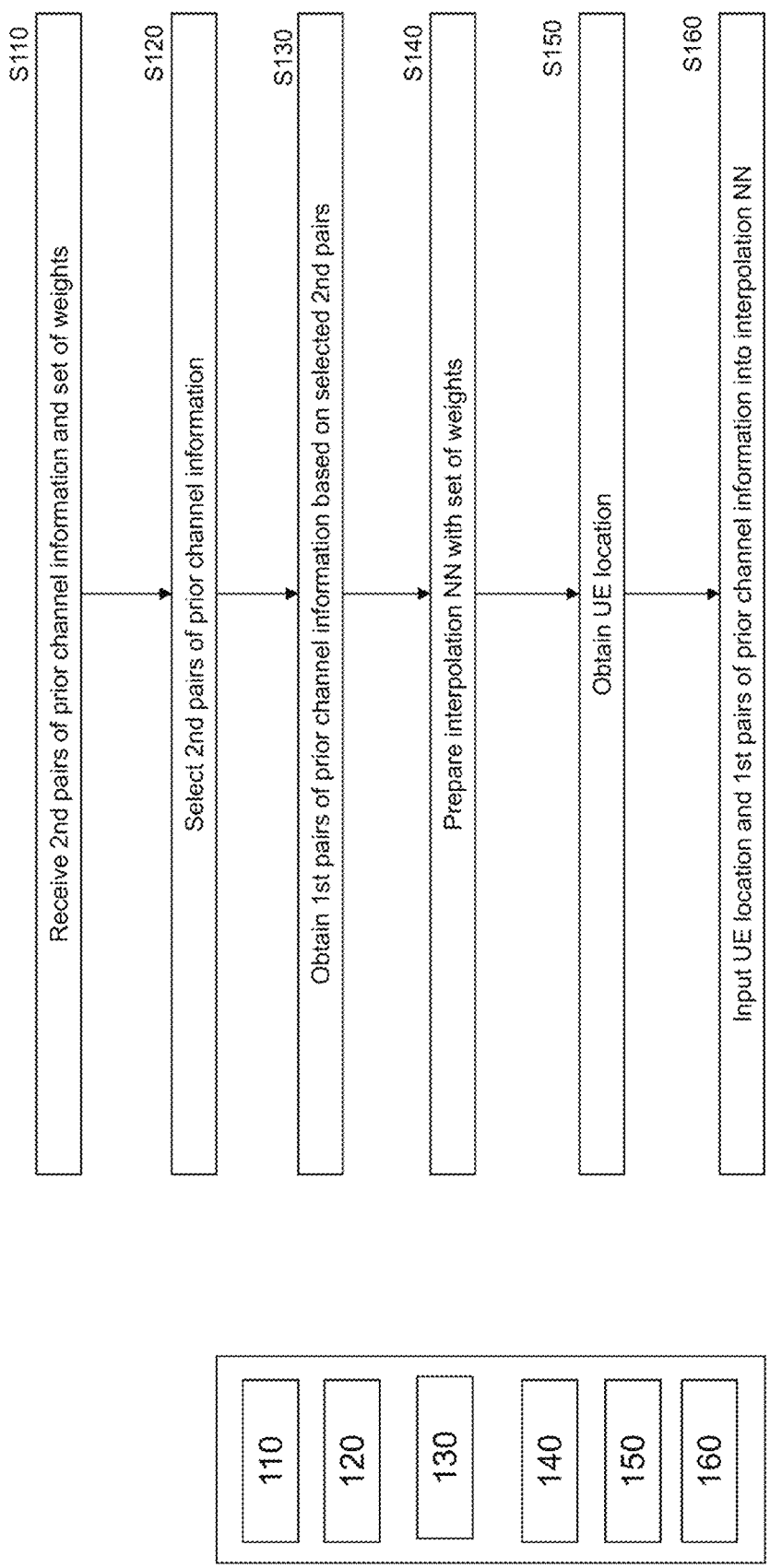

MULTIPLE CHANNEL CSI RECREATION

FIELD OF THE INVENTION

The present disclosure relates to CSI recreation. In particular, it may relate to CSI recreation in case there are plural channel components.

Abbreviations

3GPP 3$^{rd}$ Generation Partnership Project
4G/5G/6G 4$^{th}$/5$^{th}$/6$^{th}$ Generation
AI Artificial Intelligence
AP Antenna Port
BVDM Building Vector Data Matrix
CSI Channel State Information
DNN Dense Neural Network
FDD Frequency Division Duplex
FR Frequency Range
GAN Generative Adversarial Networks
gNB 5G NR Node B
GPS Global Positioning System
IBN Information Bottleneck
ID Identifier
JT CoMP Joint Transmission—Coordinated MultiPoint
LOC Location
LOS Line of Sight
MAC Medium Access Control
MIMO Multiple Input-Multiple Output
ML Machine Learning
mMIMO massive MIMO
MPC Multi Path Component
MSE Mean Squared Error
MU MIMO Multi User MIMO
NL Non-linear
N LOS non-LOS
NN Neural Network
NR New Radio
PHY Physical (layer)
PUCCH Physical Uplink Control Channel
RAN Radio Access Network
ReLU Rectified Linear Unit
RF Radio Frequency
RS Reference Signal
RX Receive(r)
SL Supervised Learning
SNR Signal to Noise Ratio
TRP TX/RX Point
TX Transmit(ter)
UE User Equipment
UL Uplink
UNN Untrained Neural Networks
URA Uniform Rectangular Array
VAE Variational Auto Encoder

BACKGROUND

Cell free massive MIMO systems might provide high gains in case accurate channel state information (CSI) is available for all channel components being received by a UE with a power above a certain power threshold (relevant channel components). Former system level simulations indicate possible spectral efficiency gains of 100 percent or even more.

A challenge in combination with FDD systems at FR1 below 6 GHz RF frequencies is the need to accurately report a multitude of 10, 50 or even more relevant channel components. For comparison, the overhead for NR Release 17 Type II CSI reporting is in the range of 100 to 150 bit for a single four beam cell. Extending this to a multi TRP cooperation area with, e.g., 40 relevant channel components, then we get a tenfold overhead of 1.5 kbit per CSI report. Typically, even for nomadic users, the CSI will be reported every 5 to 10 ms so that the PUCCH rate per UE will be about 1.5 to 3 Mbit/s. For MU MIMO this very high UL rate is then needed for a multitude of UEs, which poses a challenge with respect to scarce UL resources and power consumption per UE.

AI/ML provides new options to implement CSI reporting and often discussed are variational auto encoders (VAE), which leads to the information bottle neck method (IBN) as illustrated in FIG. 1. In a typical setup, the encoder of the VAE would be at UE side and the decoder at the gNB side. The VAE is then trained to the expected channel characteristics and in such a way that the information bottle neck—i.e., the size of the over the air reported ML information—is minimized. Note that an autoencoder first tries to decode the input signal with a minimum length vector and then to reencode the same signal based on this minimum length input vector. The minimum length vector is then the information bottleneck and might be used for efficient reporting of CSI information. For a desired maximum reconstruction error ε and a given radio channel distribution there will be a minimum size of the information bottleneck, which is defined by theoretical limits like the Kullback Leibler divergence.

One can consider different options to go beyond the limits of this basic VAE method. For example, using strong mMIMO beamformers per channel component can reduce the information content per beam, due to the lower number of relevant multipath components (see, e.g., FR mMIMO precoding). Another approach is to apply channel prediction and to learn over time the inner signal structure of the radio channel.

In the prior art, Untrained Neural Networks [1-3] are used for MIMO channel estimation [1]. The term "untrained" refers to the fact that there is no need to do extensive dataset collection for training. The iterations of the gradient descent are performed over a single high dimensional dataset point. Therefore, the neural network architecture is fitted to one specific data realization without overfitting. For instance, if a MIMO channel measurement is noisy, one may find a network structure capable of reproducing this channel measurement with reduced noise. This is called denoising capability, and, for the untrained neural networks, this characteristic is attributed to the fact that the network architecture learns a prior structure of the measurement.

FIG. 2 presents a generic untrained neural network (UNN) structure with L computational blocks designed in accordance with the deep decoder in [2]. In FIG. 2, the blocks 1 to (L−2) represent the inner layers formed by a convolutional layer with filter size (k,1,1), a two-dimensional bilinear upsampling operation, a ReLU activation function, and a batch normalization layer. The block (L−1) is the pre-output layer and comprises a convolutional layer with filter size (k,1,1), a ReLU activation function and a batch normalization layer. The block (L) is the output layer which comprises a convolutional layer with filter size (2M, 1, 1) and an activation function, such as a hyperbolic tangent activation function. The UNN structure is in accordance with the deep decoder in [2], except that the activation function of the output layer is changed to better represent wireless channels. Here, M is the number of antennas at gNB and k is a hyperparameter, the number of convolutional filters in each layer. The value of k may be set according to the environment characteristics. The maximum number of inner layers is typically limited by the size of the measurement grid in [frequency ($N_{sub}$), time ($N_{sp}$)] domain, that is (L−2)=$\log_2$(N) if $N_{sub}$=$N_{sp}$=N, due to the upsampling operation.

$H_{est}$ is the channel estimated at the output of the UNN. The weights of the UNN are iterated such that $H_{est}$ fits $H_{mes}$ (with a given fault tolerance), wherein $H_{mes}$ is the channel measurement (not shown in FIG. 2). As a result of the iterations, the combination of the input seed with the UNN weights gives $H_{est}$ which fits to $H_{mes}$. In UNNs, one may use supervised learning with a noisy channel $H_{mes}$. It differs from common deep neural networks (DNNs) because of the noisy channel. In DNNs one needs a noiseless channel/label to train the DNN using supervised learning.

Hyperparameters define a neural network, such as the number of layers or filters, the activation function, etc. They are not adapted during iteration but kept fix. In particular, the weights, which are adapted during the iteration do not belong to the hyperparameters.

REFERENCES

[1] E. Balevi, A. Doshi, and J. G. Andrews, 'Massive MIMO Channel Estimation With an Untrained Deep Neural Network', IEEE Transactions on Wireless Communications, vol. 19, no. 3, pp. 2079-2090, March 2020, doi: 10.1109/TWC.2019.2962474.
[2] R. Heckel and P. Hand, 'Deep Decoder: Concise Image Representations from Untrained Non-convolutional Networks', arXiv:1810.03982 [cs, stat], February 2019. Available: http://arxiv.org/abs/1810.03982
[3] D. Ulyanov, A. Vedaldi, and V. Lempitsky, 'Deep Image Prior', Int J Comput Vis, vol. 128, no. 7, pp. 1867-1888, July 2020, doi: 10.1007/s11263-020-01303-4.
[4] B. V. Boas, W. Zirwas and M. Haardt, "Two-step Machine Learning Approach for Channel Estimation with Mixed Resolution RF Chains," 2021 *IEEE international Conference on Communications Workshops (ICC Workshops)*, 2021, pp. 1-6, doi: 10.1109/ICCWorkshops50388.2021.9473491.

SUMMARY

It is an object of the present invention to improve the prior art.

According to a first aspect of the invention, there is provided a method, comprising receiving one or more second pairs of prior channel information, wherein each of the second pairs of prior channel information comprises a location information related to a respective prior channel from a base station and a second representation of the respective prior channel;

selecting one or more of the second pairs of prior channel information;

for each of the selected second pairs of prior channel information: obtaining a respective selected first pair of prior channel information, wherein each of the selected first pairs of prior channel information comprises the location information related to the respective prior channel and a first representation of the respective prior channel, and the first representation is based on the second representation;

receiving, for a channel between a terminal and the base station, a set of weights for an interpolation neural network;

preparing the interpolation neural network having the set of weights for the interpolation neural network;

obtaining a terminal location information indicating a location of the terminal;

inputting the terminal location information and the selected first pairs of prior channel information into the interpolation neural network to obtain a first estimation of the channel between the terminal and the base station as an output from the interpolation neural network.

According to a second aspect of the invention, there is provided a method, comprising receiving a terminal location information or a location-like information from a terminal;

selecting one or more first pairs of prior channel information among one or more stored first pairs of prior channel information based on the terminal location information or the location-like information, respectively;

inputting the terminal location information or the location-like information, respectively, and the selected one or more first pairs of prior channel information into a trained interpolation neural network to obtain a first estimation of a channel between the terminal and a base station as an output from the interpolation neural network;

providing the weights of the trained neural network to the terminal; wherein each of the one or more first pairs of prior channel information comprises a location information related to a respective prior channel and a first representation of the respective prior channel.

Each of the methods of the first and second aspects may be a method of CSI recreation.

According to a third aspect of the invention, there is provided an apparatus comprising: one or more processors, and memory storing instructions that, when executed by the one or more processors, cause the apparatus to perform the method according to one of the first and second aspects.

According to a fourth aspect of the invention, there is provided a computer program product comprising a set of instructions which, when executed on an apparatus, is configured to cause the apparatus to carry out the method according to any of the first and second aspects. The computer program product may be embodied as a computer-readable medium or directly loadable into a computer.

According to some embodiments of the invention, at least one of the following advantages may be achieved:

- a high number of channel components may be obtained with high accuracy but reasonably low overhead; CSI for a multitude of channel components may be recreated from a single reported ML vector $m_{opt}$ (indicating the position of the UE)
- Benefit from pre-trained prior knowledge for the gNB environment so that the overhead for the CSI feedback of the multitude of channel components can be decreased significantly.
- At the same time, there is no explicit BVDM knowledge needed as the deterministic part of the radio channels is inherently learned and inferred from UE data reports and/or raytracing simulations.
- The learned prior knowledge includes inherently all relevant RF related effects into the trained ML model.
- AI/ML provides flexibility so that the trainable models can adapt to varying environment conditions like the classical morning, evening, or, night variations.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 1 illustrates the IBN method;

FIG. 7 shows a BVDM (left part) and a PHY layer model (right part) for a portion of the UE shown on the BVDM on the left side;

FIG. 9 illustrates a simulation environment;

FIG. 15 illustrates integration of location specific NNs into a single larger one;

FIG. 16 illustrates an extension of the concept to include, besides the deterministic description of the radio channel, a variable part, which recreates the effects of moving objects, variations of the BVDM like open or closed windows, etc.;

FIG. 18 shows an apparatus according to an example embodiment of the invention;

FIG. 19 shows a method according to an example embodiment of the invention;

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

A goal of some example embodiments of this invention is to report the CSI for a high number of channel components with a high accuracy, but reasonable low overhead. Note that each channel component itself might comprise a high number of relevant channel coefficients.

For that purpose the idea of model based channel prediction—a method including prior knowledge from a digital twin—is combined with options provided by ML/AI. Especially, it is proposed to recreate a high number of radio channel components from a neural network (NN), where the scenario specific radio channel details are inherently stored in the NN. For a reasonable and efficient implementation an 'interpolating' NN is being proposed.

A focus of some example embodiments of this invention will be on generating and benefiting from prior knowledge. Basically, all prior knowledge available at UE as well as gNB side can be skipped from reporting. Conventionally, such prior knowledge might be provided by a digital twin—or mirror world—for the gNB environment, e.g., as a building vector data map (BVDM). Challenges with respect to a digital twin are that it i) might not be available in many cases, ii) typically provides only the geometrical structure of the environment without the RF characteristics, iii) is limited to long term deterministic effects, and, iv) might have limited accuracy.

Figure 3:
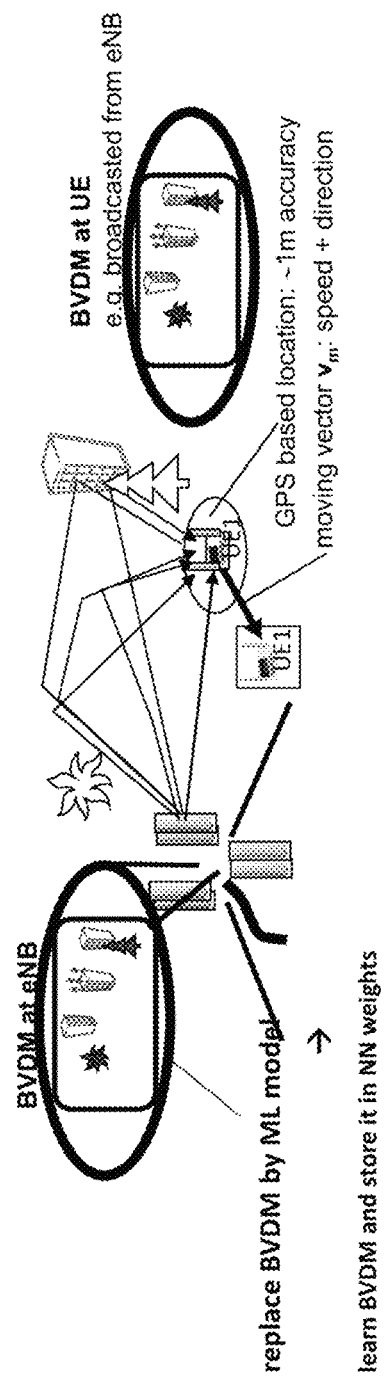
FIG. 3 illustrates channel estimation according to the prior art and a correspondence to some example embodiments of the invention.

Therefore, some example embodiments of the invention replace the prior knowledge of a digital twin by a learned prior knowledge as part of an AI/ML solution, as illustrated in FIG. 3. Thus, the gNB can work without having a BVDM available. Instead, it may learn it's environment from UE uplink reports over a longer training period.

In general, applying ML based prior knowledge for effective CSI reporting may lead to one or more of the following problems:

i) How to recreate a high number of relevant channel coefficients with a single reported ML vector of limited size?

ii) How to achieve and to integrate the prior knowledge (BVDM) into AI/ML neural networks? Especially, the question is how to do this efficiently in order to avoid training of one ML instance per possible UE location.

iii) How to chose and how to calculate the single ML vector, which has to be reported for recreation of the multiple channel coefficients?

Some example embodiments of this invention provide a solution to at least one of these questions.

In a nutshell, some example embodiments of the invention may operate as follows:

gNB trains an interpolation NN (named NN4 further below). NN4 has plural inputs:

a location input for inputting a location (e.g. of a UE, to which the channel is to be estimated); and one or more pairs of information, wherein each pair of information comprises a location indication and a respective channel estimation ("pair(s) of prior channel information"). The channel estimation may be provided in terms of a channel matrix $H_{mes}$. However, preferably, the channel estimation is provided as weights of respective UNNs, as explained further below (named NN1 to NN3 further below).

The output of the interpolation NN is a channel estimation for the location input into the interpolation NN. The output channel estimation may be of the same or a different format as the input channel estimations.

The interpolation NN is trained by channel measurements from plural locations ("training locations", e.g. 50 training locations, or 100 training locations, or 300 training locations, etc.) in the relevant area. In the training, the pair(s) of prior channel information and (successively) one of the training locations are input into the interpolation NN, and the weights are adapted such that a cost function is minimized. The cost function is selected such that a difference between the output from the interpolation NN and the channel estimation for the respective training location is minimized (less than a predefined error) and such that, for each of the prior channel location(s), if the respective prior channel location is input into the interpolation NN, a difference between the output of the NN and the channel estimation included in the respective pair of prior channel information is minimized (less than a predefined error). Thus, the trained interpolation NN obtains knowledge of the environment.

Figure 4:
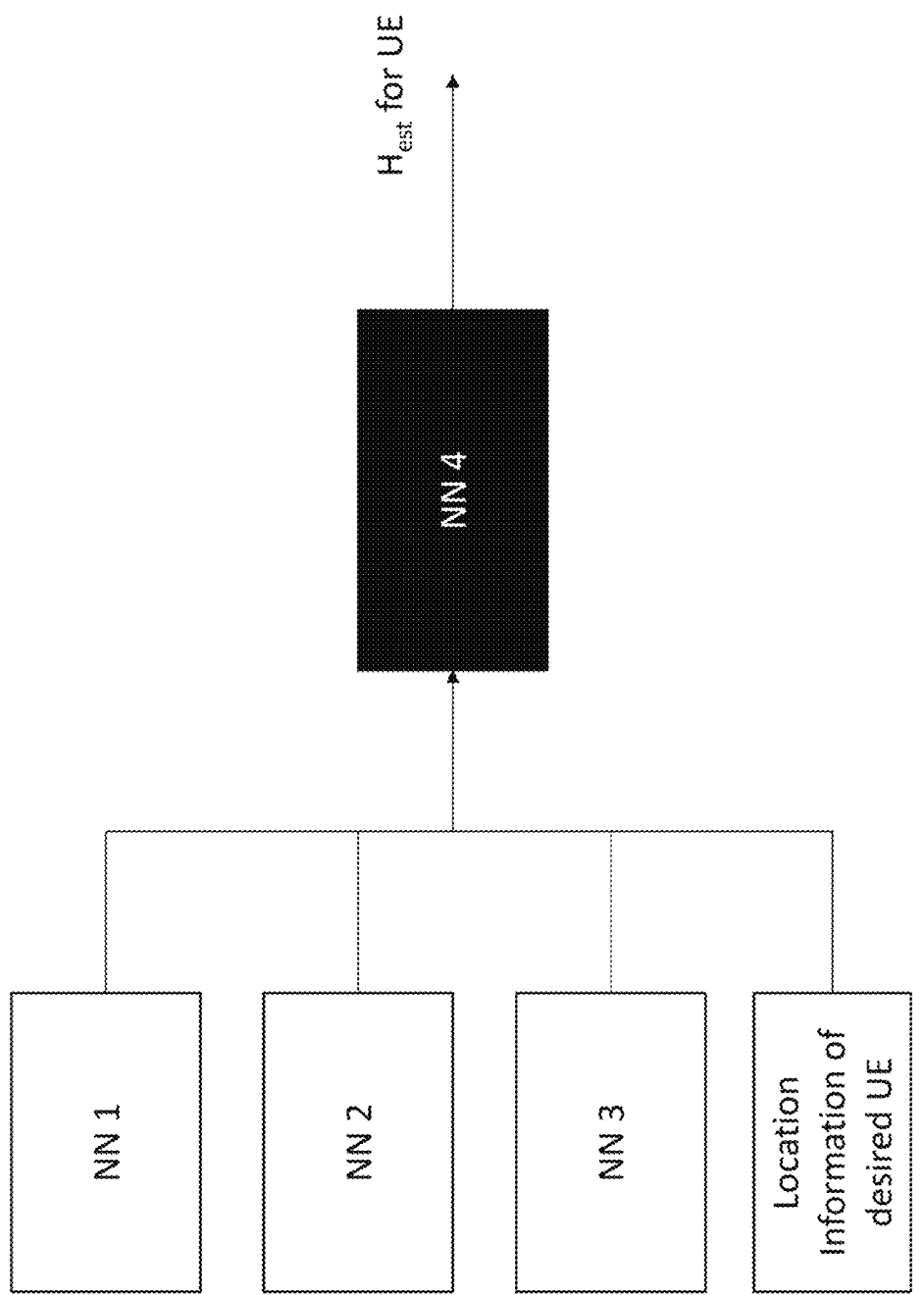
FIG. 4 illustrates an inference phase according to some example embodiments of the invention.

For inference, as shown in FIG. 4, the trained interpolation NN and the pair(s) of prior channel information are provided to the UE. UE provides its location to gNB. Both, UE and gNB, input the location of the UE and the pairs of prior channel information into the interpolation NN and obtain, thus, a channel estimation for the location of the UE. UE and gNB may use this channel estimation for encoding and/or decoding messages between UE and gNB.

In some example embodiments, there may be more pairs of prior channel information than corresponding inputs to the interpolation NN. In such cases, gNB may use, during training, one fixed subset of the pairs of prior channel information, but the entire set of pairs of prior channel information may be provided to the UE. During inference, UE and/or gNB may select a subset of pair(s) of prior channel information which is most suitable for the location of the UE (close by, or similar radio conditions, . . . ). The selection in gNB and UE may be made according to the same criteria, or one of UE and gNB informs the other of UE and gNB about the selection. If the number of pairs of prior channel information fits to the number of inputs into the interpolation NN, "selecting" means using all of the pairs of prior channel information. Then, both UE and gNB may input the same subset of pair(s) of prior channel information into the interpolation NN. Note that in these cases, the selected subset may be different from the subset by which the interpolation NN was trained. It is assumed that the interpolation NN is nevertheless sufficiently well trained in a certain area.

In some example embodiment, a further refinement is performed. gNB trains a refinement NN (denoted NN5 later on). The training data used to train the interpolation NN are assumed as the ground truth. These training data (location and/or channel estimation) are distorted by some predefined noise. The refinement NN is trained such pairs of undistorted and distorted channel estimations are input, and the output of the refinement NN, which is location—like information, is close to the true location (ground truth) according to the same cost function used for training of the interpolation NN. Note that the location-like information may actually not have a direct physical meaning. The trained refinement NN is provided from gNB to UE.

In inference, UE inputs each measured channel estimation and the channel estimation obtained from the interpolation NN into the trained refinement NN. UE provides the output of the trained refinement NN (a location-like information) to gNB. gNB inputs the location-like information into the trained interpolation NN to obtain a channel estimation for the UE, which is typically closer to the measured channel estimation. Thus, for encoding, UE may use the measured channel estimation, and gNB may use the channel estimation obtained from the interpolation NN with the location-like information as an input.

Hereinafter, the invention is described at greater detail.

Some example embodiments of the invention are inspired by the chaos theory, where a single complex input value can generate infinite complexity, as known for the famous Mandelbrot set. That is, one non-linear (NL) activation function fed by a single vector may recreate multiple parameters for a multitude of multi path components. Note that for AI/ML the multitude of relevant channel components does not have to be represented by the PHY layer multipath component parameters (e.g. delay, amplitude, phase, direction of arrival, etc). I.e., the single vector is sufficient to recreate the channel if input into the NN with the non-linear activation function, although the components of the single vector cannot be mapped to any physical parameter.

Now, it is described how a UNN may be used to represent the prior channel information (location of the terminal, where the prior channel is directed to, prior channel estimation).

Figure 2:
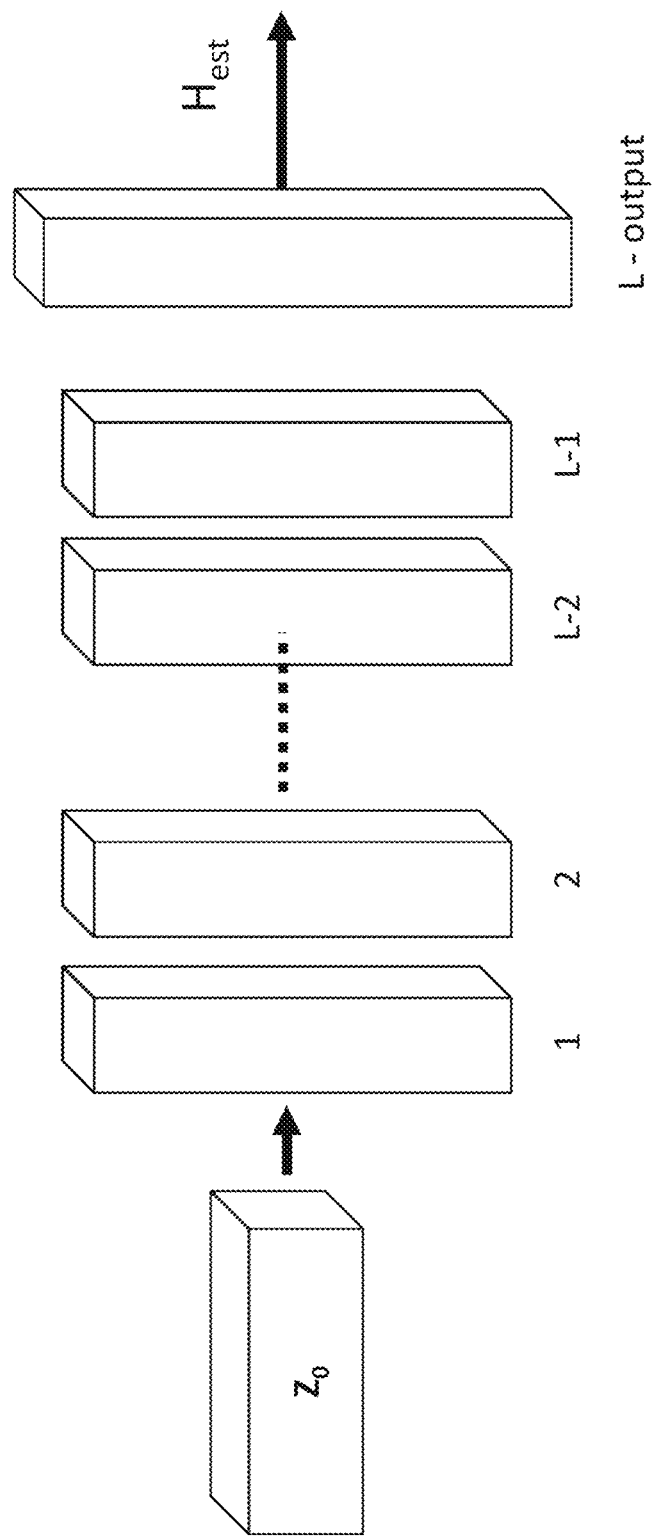
FIG. 2 illustrates an untrained neural network with its seed that may represent a channel estimation according to the prior art.
Figure 5:
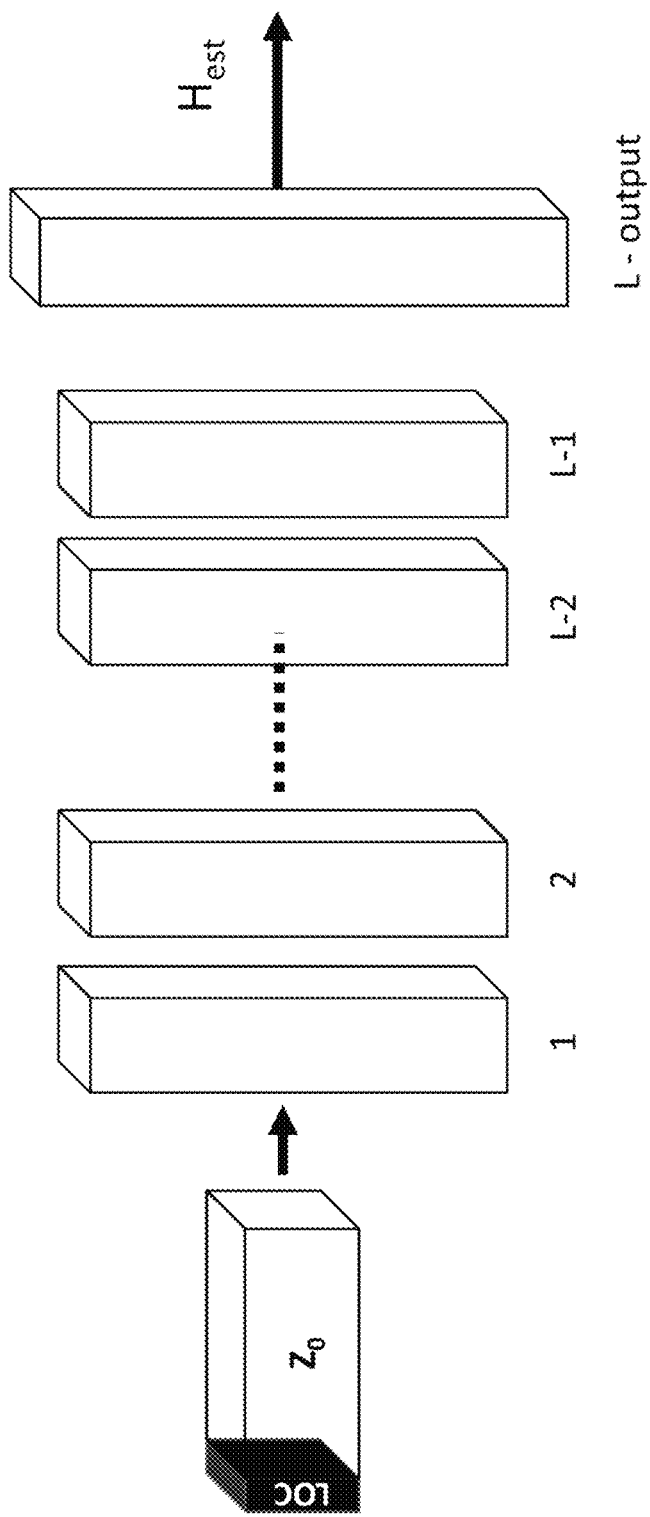
FIG. 5 illustrates an untrained neural network with its seed that may represent a channel estimation according to some example embodiments of the invention.
Figure 6:
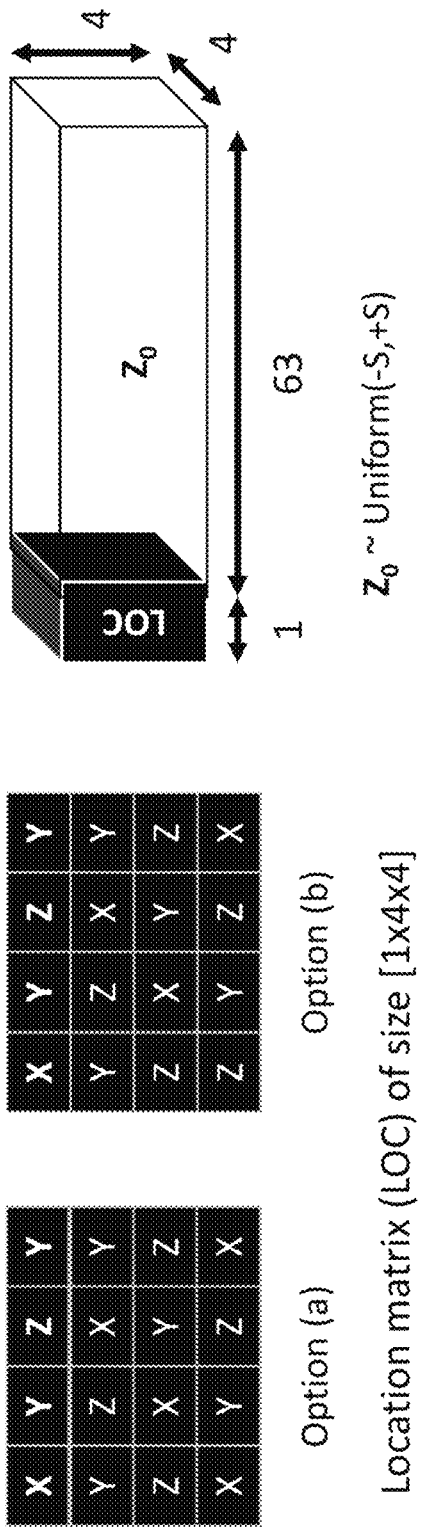
FIG. 6 illustrates details of the input seed for the untrained NN of FIG. 5 according to some example embodiments of the invention.

In the literature, little attention is given to the definition of the UNN input seed if a UNN is used for MIMO channel estimation. A common approach [1-3] is to have an input seed drawn from a random distribution ($Z_0$ in FIG. 2). Some example embodiments of the invention provide a way how to embed UE location information into the input seed to make the ML model reusable, as shown in FIG. 5 and FIG. 6. Namely, the input seed comprises the location (input seed=LOC+random seed). The location may be indicated as physical coordinates (e.g. Euclidian (X, Y, Z) or some geo-coordinates), or it may be indicated by some ML specific parameters that may be mapped to the physical location.

Some example embodiments of the invention provide a CSI reporting scheme with reduced overhead and a machine learning (ML) method. For example, the ML method may be based on the UNN concept or on some other ML methods, for instance conditional generative adversarial networks (cGANs). Hereinafter, a powerful and low complexity ML method based on UNN is described as an example of how to use the low overhead CSI reporting.

That is, during training (i.e. in the preparation phase of the training of the interpolation NN), UE and gNB both run a UNN defined by the same hyperparameters. When UE measures the channel (i.e., $H_{mes}$), it performs iterations of the NN such that $H_{est}$ fits $H_{mes}$. The seed used by UE comprises an indication of the location of the UE. When the iteration is finished (i.e. $H_{est}$ fits $H_{mes}$), the weights, the random portion of the input seed, and the indication of the location of the UE (included in the input seed) comprise all the relevant information of the environment. Accordingly, UE may report the input seed (including the indication of the location of the UE as in FIG. 6) and the weights (when the iteration is finalized), to gNB. UE may not report to gNB $H_{mes}$, $H_{est}$, or any channel components in this case. Since gNB has a UNN defined by the same hyperparameters as the UNN used by UE, gNB may derive $H_{est} \approx H_{meas}$ based on the received parameters. From $H_{est} \approx H_{mes}$, gNB may derive the channel components. Thus, gNB may derive the channel components for each UE location.

However, the input seed to the UNN may be quite large, depending on the NN architecture. Nonetheless, according to some example embodiments of the invention, there is no need to report the input seed. Instead, UE reports the parameters to derive the input seed in FIG. 6. In Table 1, parameters (hereinafter also called "ML vector") are listed that gNB and UE may exchange.

TABLE 1

CSI reporting by ML vector
CSI reporting ($m_{opt}$)

| Information | Comments |
| --- | --- |
| Random seed number(s) | Real number, one per gNB |
| Distribution type | Gaussian, uniform |
| Distribution parameters | (mean/variance), (interval - S) |
| Location | (X, Y, Z), preferably with centimeter accuracy |
| Tensor of weights | Layer weights derived when training/iterating |
| Need training/iterations | 0 if no further training/iterations needed, p is number of training epochs/iterations |

The random part of the input seed may be recovered if the random seed number(s), the distribution type (e.g. Gaussian, or uniform) and its distribution parameters (e.g. mean and variance, or interval of width 2S) are known. However, the way how to embed the location information is not obvious. FIG. 6 shows candidates for building the UNN input seed.

According to prior art, the input seed $Z_0$ (in our experiments of size [64,4,4]) is drawn from a uniform random distribution. According to some example embodiments, one of the random matrices in $Z_0$ is replaced by the location information. The location matrix may be arranged in the input seed, as shown in FIG. 6 (right). However, instead of the arrangement shown in FIG. 6 (right), the location matrix may be arranged at any position within the input seed, as long as the position is predefined (the same for both UE and gNB). Our simulation results, presented later, show that UE location information with centimeter-level accuracy should preferably be available. Small changes in location report may cause degradation in the channel estimation, while errors on meter range may make the estimation unrecoverable, if the UNN is not re-iterated.

FIG. 6 (left) shows two examples of a location matrix (options a and b). In general, the location matrix should comprise the three location coordinates (e.g. X, Y, Z in Euclidian system, other location representations are feasible, too). Preferably, each column and each row comprises each of the three location coordinates. Furthermore, preferably, neighboring matrix elements should not comprise the same entry.

The information elements "Need training" and "iterations" in the ML vector of Table 1 are optional. The information element "Need training" may be used e.g. in one of the following ways: The gNB may send a ML vector built by UE2 for UE1. The gNB knows this is not correct, but UE1 may gain something starting from its neighbor UE2. So, the gNB uses the information "Need training/iterations" to tell the UE that it needs to perform measurements and iterate the model further. Optionally, gNB may indicated the number of required iterations 'p'. Also, in communication from UE to gNB, the information element "Need training" may be used by the UE to tell the gNB that the ML vector sent before was wrong and it had to be updated.

In some example embodiments, only the Boolean information element "Need training" is available. In some example embodiments, the numerical information element "iterations" is available, too. In some example embodiments, only the numerical information element "iterations" is available. In these example embodiments, a zero (or some other predefined value) in this information element means that training is not needed, i.e. both sides agree and there is no fault. If the information element has a value different from zero (the predefined value), training is needed.

Some example embodiments are particularly efficient in saving time by using the derived ML models. Hereinafter, different phases of usage of the ML models are described. They address in particular early-stage cases, where the gNB does not store too many models (e.g. UNNs with respective ML vector) for specific locations. Here, dense neural network (DNN) are described, but any trainable ML structure may be used instead.

Step I

As neural networks comprise typically non linear activation functions, such as ReLU, some example embodiments of the invention use, e.g., a dense neural network (DNN), or an untrained neural network (UNN), as nonlinearity, comprising many neural network (NN) nodes and weights, where each node includes one ReLU function. Depending on the size of the DNN, it is possible to recreate, from one single input vector, a few to a multitude of relevant channel components.

As discussed above with respect to FIG. 3, the location specifically trained DNN may replace the BVDM for a certain area in the gNB environment. By supervised learning, the DNN has to be trained to the environment to incorporate the prior knowledge about the relevant parts of the geometry, the RF-characteristics like the reflection or diffraction coefficients, etc. Note that in a combined offline and online supervised learning (SL) training the DNN might be first trained to a coarse BVDM of the environment using a raytracing simulation (offline training) and then fine tuned based on full CSI feedback from UEs (online training). In the latter online training, the conventional full CSI reports during training phase may be regarded as the ground truth.

FIG. 7 shows on the left side a BVDM with a UE, and on the right side a PHY layer representation of the measured radio channel close to the UE position depicting the evolution of the amplitudes $\alpha$ and delays $\tau$ of about 50 multipath components over time t for a moving UE (50 UE locations along a straight line of 50 cm). As can be seen from the right side of FIG. 7, the PHY layer representation evolves smoothly such that, in a certain area, a channel estimation may be based on a same model.

Step II

When the UE moves to another position (or if another UE having a beamformer being the same as that of the former UE is at the other position), then the NN weights (or hyperparameters) have to be updated to the new position. Generally, it would be possible to define a geometrical grid and to define one NN for each grid point. For CSI reporting the UE would just report the grid point ID and then the gNB can recreate the radio channel from the related NN for this grid ID.

However, in some scenarios, CSI may be very sensitive to the UE position, i.e., the grid size would have to be in the range of centimeter to even millimetres, which would lead to more than ten thousand grid points—or, NNs—per square meter. Note that this number will explode further for a real world three dimensional grid for the UE position!

Figure 8:
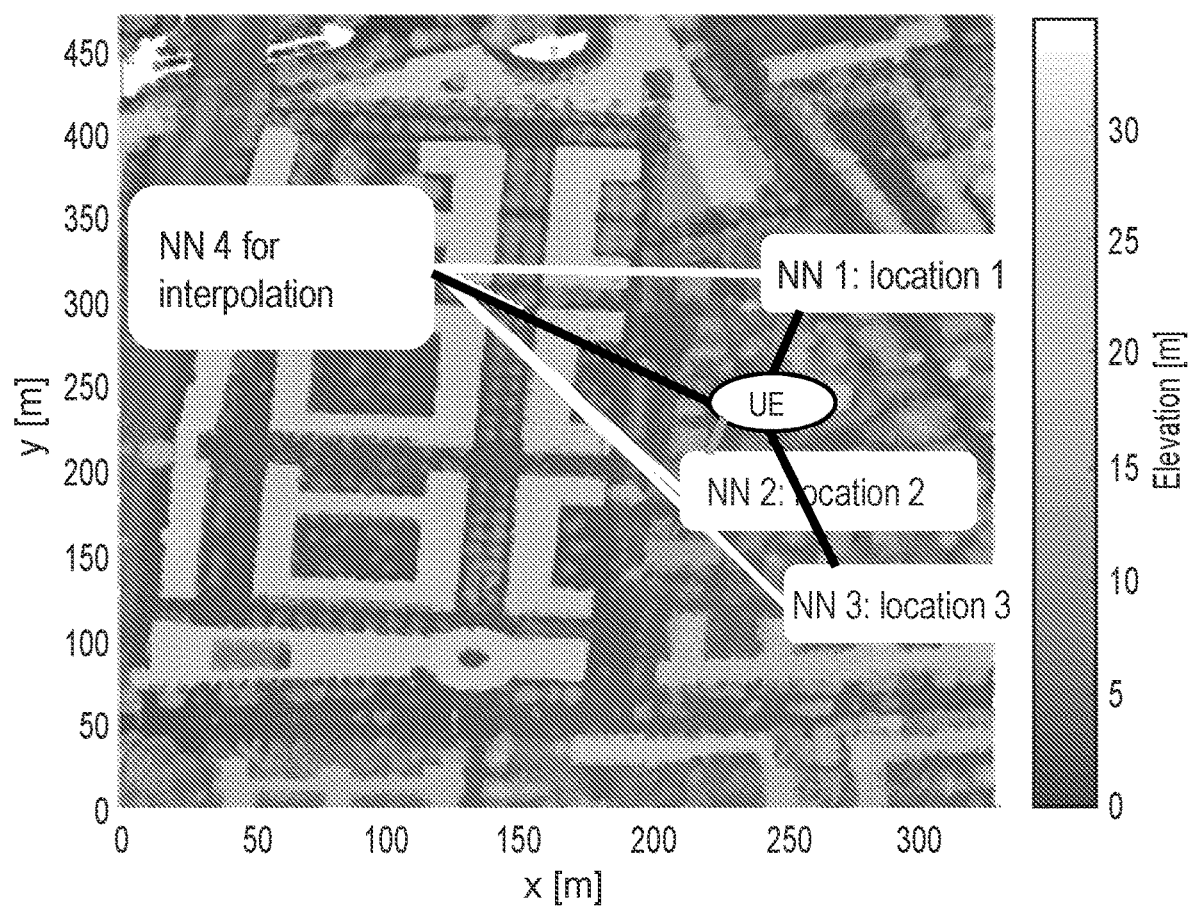
FIG. 8 illustrates an interpolation principle according to some example embodiments of the invention.

On the other hand, in many areas of the cell there will be a smooth variation of the radio channels due to the linear evolution of the multipath components (see FIG. 7, right part). Due to these inherent correlations between the CSIs at different locations, a more efficient NN structure may be adopted, as illustrated in FIG. 8. Here, it is assumed that the gNB has learned accurate recreation of CSI for a set of locations, like the locations 1, 2 and 3. If the UE is at one of these locations, it may directly report its related ML vector and the gNB can recreate the CSI from the related NN. But, most likely the UE will be located somewhere in between the predefined locations and then the UE reports a related intermediate ML vector. In the simplest case, UE may report the location vector of the UE only. From this information, the gNB may select the N closest pretrained NNs and uses the neural network NN 4 to 'interpolate' the results from the neural networks NN 1, NN 2 and NN 3.

The meaning of the term 'interpolation' is here as follows: The neural network NN 4 is especially trained to recreate the CSI of a multitude of channel components from the relative UE position from NN 1 to NN 3. This results in a two step training process for NN4 related to the intermediate position, where first the neural networks NN 1 to NN 3 are trained for their specific locations following UNN approach and then the NN 4 (e.g. DNNs, CNNs, or cGANs) is trained over a bigger dataset to perform an 'interpolation'-like operation that can recreate CSI of UEs in the vicinity of the UEs described by NNs 1 to 3.

That is, since there are untrained NNs which reflect the environment (and, thus, the channel components) for specific locations, some example embodiments allow to combine the output of these "prior channel NNs" (NN 1 to NN 3) as input to a further NN (NN 4) trained to derive the channel in a new intermediate position. The functionality of NN4 is called 'interpolation' as it reflects the environment (and, thus, the channel components) of an intermediate position.

As one option, one may implement the NN 4 using a cGAN where the CSIs recreated by the NNs 1, 2 and 3 are used as conditional input together with location information of the UE of interest. The channel of the UE of interest is expected in the output. For training of NN 4, a bigger dataset (i.e. a large number of training pairs of information (location; channel estimation) is used (different from UNNs) such that the location-measurement relationship can be generalized. For the cGAN implementation, the cost function is a combination of binary cross-entropy and mean squared error. In [4], a cGAN architecture is explained for a close application, estimating missing parts of the radio channel. Here, a similar architecture is used to derive the interpolation capability. Nonetheless, the solution for NN 4 functionality is not limited to cGANs, other DNN approaches may be used.

It is particularly advantageous if gNB learns the most suitable ones of the already trained neural networks NN 1, 2 and 3 to be used for interpolation. gNB may learn the most suitable NNs based on UE feedback data from different locations in the whole area of interest. In detail, one has to generate data, define the cost function to minimize the number of NNs for a given performance and to train the NNs correspondingly. The data can be from raytracing simulations and/or from UE CSI feedback recorded over longer time periods (online training). Namely, while in cases of open spaces with mainly LOS connections, a few neural networks will allow accurate 'interpolation, in NLOS scenarios with a high number of street crossings and shadowing objects the fundamental different radio channel characteristics should be covered by corresponding neural networks at some best suited NN locations.

There are two options for recreating a high number of relevant channel components, benefiting from trained prior knowledge neural networks of the gNB environment:

a) Option 1: The UE might just report its three dimensional location vector I, similar as assumed for model based channel prediction. Then, the gNB will use its neural networks NN 1 to NN 3 trained for specific locations to train NN 4 for 'interpolation' and, thus, obtain the CSI for the reported UE location I. This solution minimizes the UE reporting overhead. However, in reality it might often suffer from inaccuracies related to the trained ML models, inaccuracies of the UE location estimation, UE antenna pattern issues, etc.

b) Option 2 (Refinement of Option 1): After NN4 is trained according to option 1, the ML models NN 1 to NN 4 together with its hyperparameters are downloaded to the UE. Preferably, only that set of neural networks may be downloaded, which describes the area close to the roughly known UE position. Now, the UE and gNB share the same set of neural networks. However, the channel parameters derived from NN4 with the respective ML vector might not be optimal, e.g. due to parasitic effects, like location estimation errors. Therefore, according to some example embodiments, UE tries to identify the best fitting ML vector $m_{opt}$. For this purpose, UE may use a further neural network NN 5, which can be pretrained offline. This neural network NN 5 uses then as input the set of estimated radio channel components together with the estimated UE position I to infer the best fitting ML vector $m_{opt}$. The best fitting ML vector $m_{opt}$ may be reported on PUCCH to gNB. In addition, by applying this vector to NN 4 for CSI interpolation, the UE can verify the correctness of the reported ML vector $m_{opt}$. This method is more robust than that of option 1.

Hereinafter, an untrained neural network (UNN) for channel estimation is described which leverages the CSI reporting according to some example embodiments of the invention. I.e., the UE reports a ML vector as shown in Table 1, but may not report any measurement results and/or channel components. The general structure of the UNN corresponds to that of FIG. 5. The blocks 1 to (L−2) represent the inner layers formed by a convolutional layer with filter size (k,1,1), a two dimensional bilinear upsampling operation, a ReLU activation function, and a batch normalization layer. The block (L−1) is the pre-output layer and comprises a convolutional layer with filter size (k,1,1), a ReLU activation function and a batch normalization layer. The block (L) is the output layer which comprises a convolutional layer with filter size (2M, 1, 1) and an activation function, such as a hyperbolic tangent activation function. The UNN structure is in accordance with the deep decoder in [2], except that the activation function of the output layer is changed to better represent wireless channels. Here, M is the number of antennas at gNB and k is a hyperparameter, the number of convolutional filters in each layer. The value of k may be set according to the environment characteristics. The maximum number of inner layers is typically limited by the size of the measurement grid in [frequency ($N_{sub}$), time ($N_{sp}$)] domain, that is (L−2)=$\log_2(N)$ if $N_{sub}=N_{sp}=N$, due to the upsampling operation.

Let's assume that the gNB has M=36 antenna elements arranged in a uniform rectangular array (URA) and the UE has a single antenna with linear and parallel trajectories in a street, see FIG. 9. The hashed blocks illustrate buildings, and three UEs are moving in a street (urban canyon) between the buildings. In the measurement collection phase at gNB for a given UE, we get $H_{mes}$ of size [36, 64, 64] in complex domain with $N_{sub}$=64 subcarriers and $N_{sp}$=64 time snapshots measurements. $H_{mes}$ designates the measuring result and is the target for optimizing the weights at the UNN. Differently from other approaches using common DNNs, $H_{mes}$ is a noisy measurement. The true channel $H_{true}$ (which may be used with common DNNs) is derived from simulations at IlmProp, a geometry based simulator, see FIG. 9. The environment simulated in IlmProp was that of an urban canyon, where three UEs were simulated in a linear trajectory with different velocities. The UE's trajectories were spaced by a maximum Euclidian distance of 4 meters. The time observation window was set to 64 snapshots.

First, a UNN architecture was build to recreate the channel of UE2. In this example, the best UNN structure (i.e. hyperparameters) is identified first (optional). Once the UNN structure is defined, it is kept and only the weights are iterated. In the present case, the best UNN structure has 4 inner layers blocks with k=64 filters in each, 1 pre-output layer with K=64 filters and the output layer with 2M=2*36 filters to account real and imaginary parts of $H_{est}$. The input seed is of size [64, 4, 4] and is built as shown in FIG. 6, where LOC=[10, 5, 2.4] meters, and $Z_0$ is taken from a uniform distribution on the interval [−0.15, 0.15], so S=0.15. The $H_{mes}$ SNR is set to 20 dB and the UNN weights are optimized using gradient descent over the mean square error (MSE) cost function between $H_{mes}$ and $H_{est}$.

Figure 10:
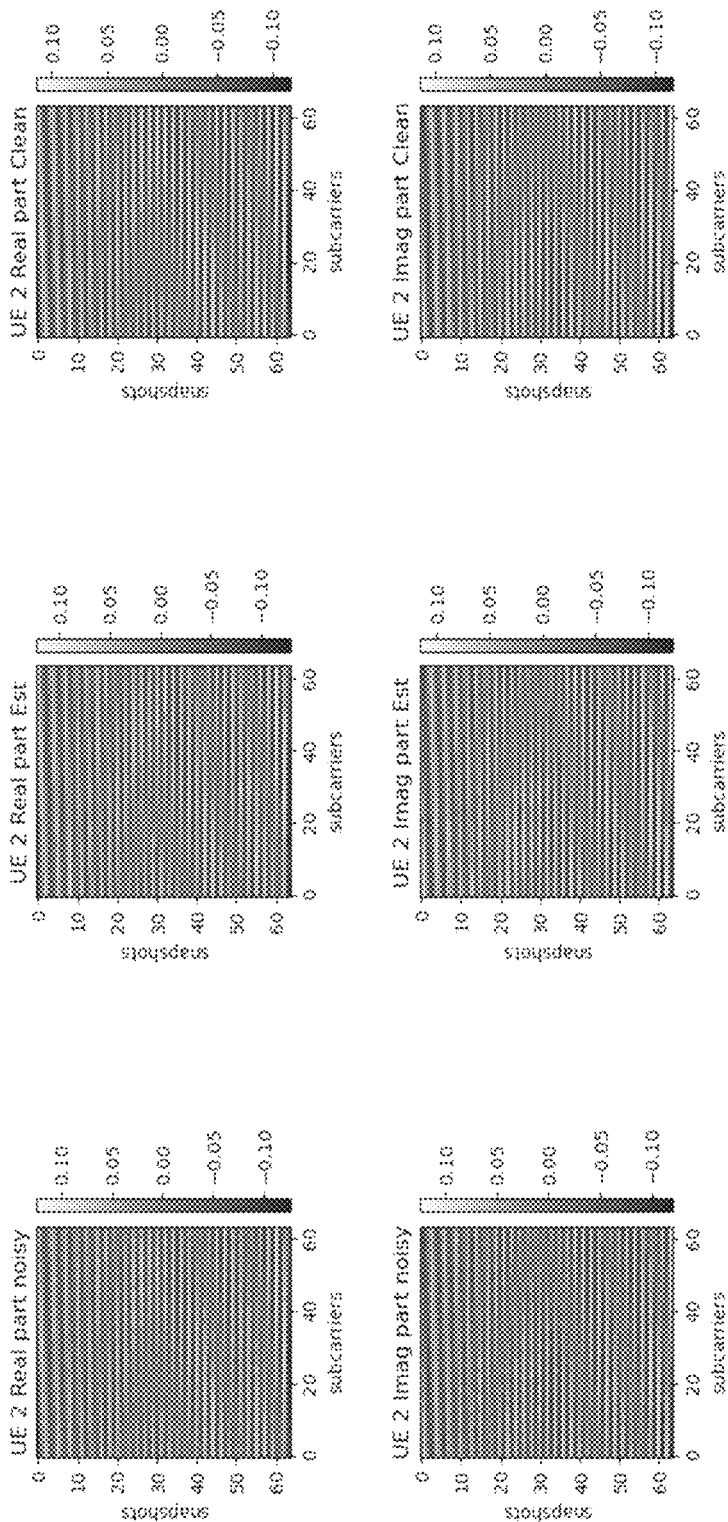
FIG. 10 shows channel estimation results for UNN; The first column shows $H_{mes}$ used to optimize the UNN weights, the second column presents the estimated channel $H_{est}$, and the third column the $H_{true}$ from the simulator.

FIG. 10 presents the channel estimation result after 25000 iterations of gradient descent (a typical number for offline training iterations), the UNN provides a gain of 4.8 dB. That is a relevant result which indicates that the UNN structure has enough representation capabilities to learn the wireless channel of UE 2 without fitting the noise within $H_{mes}$.

After the weights of the UNN are derived by the iterative process, the $H_{est}$ can be always outputted if the same input seed is used. Nonetheless, this ML model is very sensitive to changes in the input seed. For instance, if the inaccurate location is now LOC=[10, 5, 2.5] (10 cm change in z), the SNR of the $H_{est}$ reduces to 23.77 dB, or only a 3.9 dB gain. If there is any error in rebuilding the random seed ($Z_0$), $H_{est}$ is not accessible anymore. Fortunately, if any fault occurs, UNN allows returning to compute optimization iterations to re-adjust the weights to the new building conditions.

According to some example embodiments, each gNB in a cooperation area has a fixed random seed number (maybe related to the cell ID—physical cell ID or cell global ID; more precisely: provides a fixed real number to the random seed, see Table 1). Besides, the gNB may preferably store and exchange the UNN structure and weights with the other gNBs via Xn interface to provide some prior knowledge to the other gNBs. The message for informing weights and input seed from gNB to UE comprises the ML vector presented in Table 1. In case of mismatch between $H_{est}$ and $H_{mes}$ at UE side, the UE can perform further gradient iterations on the UNN, or request the gNB to do them based on the new collected $H_{mes}$. The new weights are updated to the gNB library. Note that, if there is no fault at UE side, the gNB and UE just exchange $m_{opt}$ once for each location (related to number of snapshots (equivalent to the number of UE locations) collected). The gNB library of derived models may also store the time reference of when the channel measurements were taken, and compute the velocity of the UE during the measurement collection phase. This information can be further used to adapt the estimates for UEs with different velocities, for instance.

Figure 11:
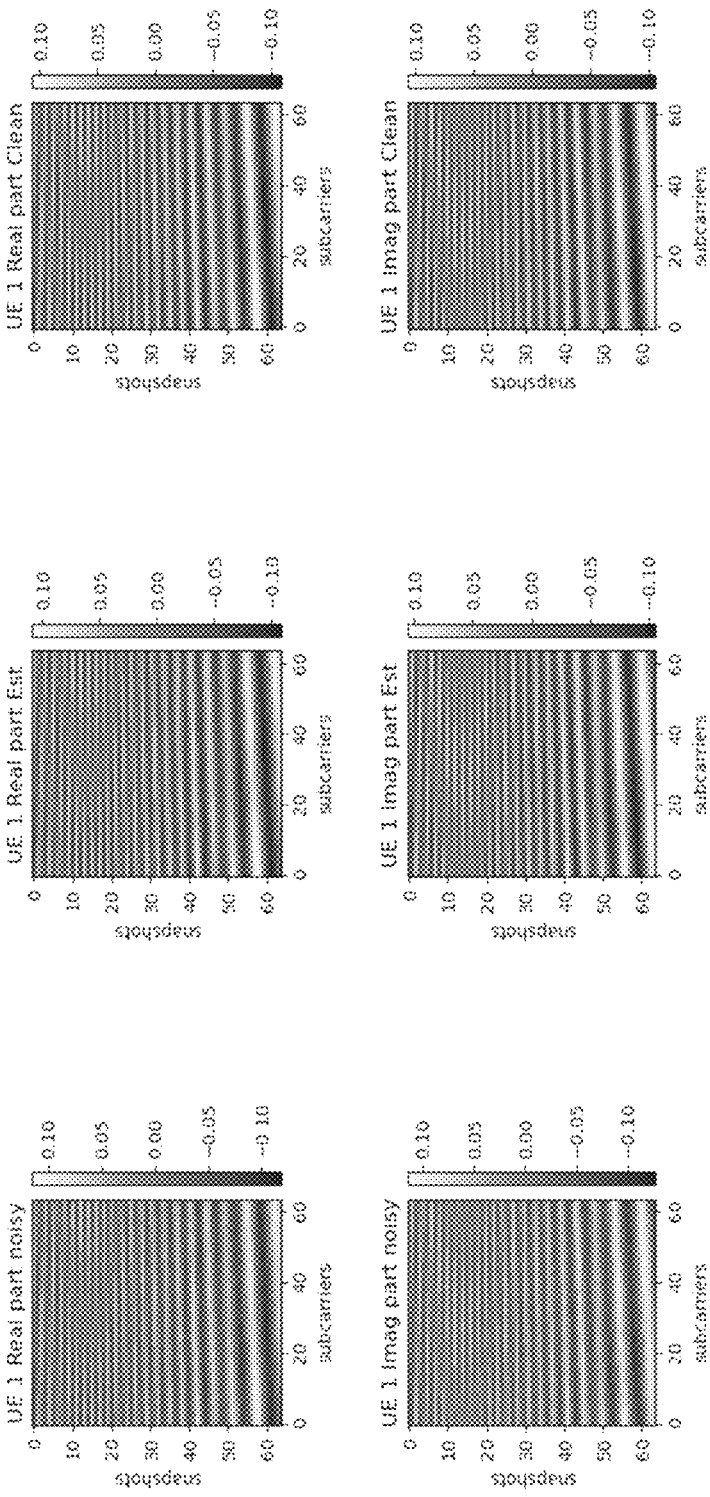
FIG. 11 shows a simulation result (corresponding to FIG. 10) after 25000 iterations for reconstructing the channel of UE1 with the weights started from UEs.

FIG. 11 presents the resulting $H_{est}$ after 25000 iterations of the UNN weights to estimate the channel of UE1, where the starting weights were taken from the UE2 model. This indicates that we can use weights of closely located UEs as starting point for optimization iterations. That choice also enhances the channel estimation. For instance, if the UNN is iterated to estimate the channel of the UE1 from random initialization, the gain is about 4.1 dB. However, if we start to iterate from the weights derived for UE2 the estimation gain for UE1 is about 7.6 dB, almost double.

The here proposed UNN structure recovers 64 time snapshots for a moving UE. This means that the UNN recreates the CSI for 64 different locations relative to the start location loc. Combining the results from NN1, NN2 and NN33 we get even the CSIs for a full subarea of the scenario over 3 times 64 UE positions. Then, even simple direct interpolation for locations between these locations at the output of the NNs with known CSI might be possible (if the locations are sufficiently close to each other). Anyway, UNNs can be used to cover and learn a whole subarea of the gNB scenario and for larger areas one might pave the area with such subarea UNNs.

Figure 12:
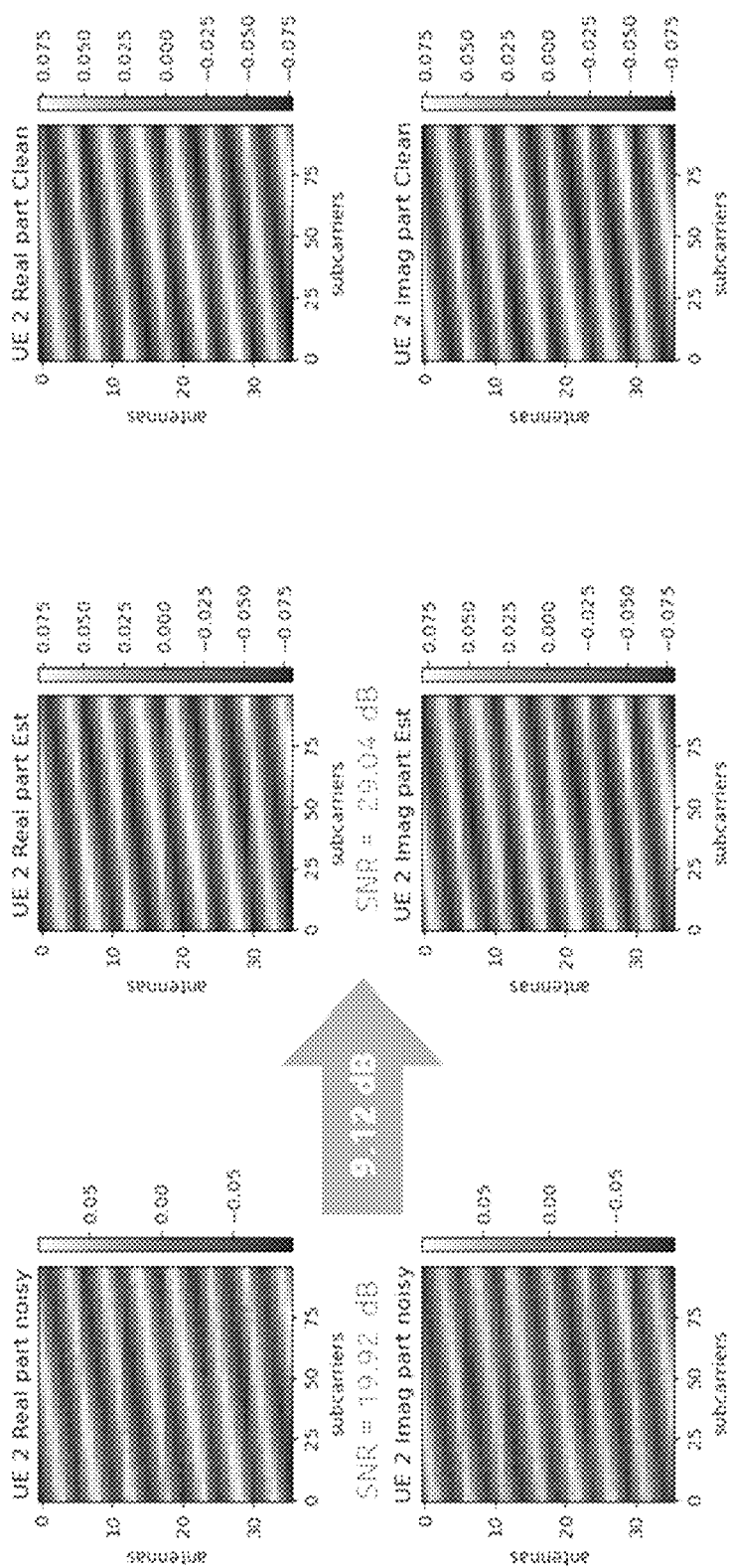
FIG. 12 shows UE 2 channel estimation with UNN for Hmes with Nsub=96, Nsp=1, M=36, and SNR of 20 dB.

In case we can't perform a measurement (data) collection phase as big as 64 time-snapshots, an UNN structure can be simplified to recover a channel with many subcarriers and antenna elements, but only 1 time snapshot. If compared to the setup described before for FIG. 5, the upsampling operations are performed only in the subcarriers dimension but not in the time dimension. In FIG. 12 we present a result for reconstructing the channel of UE 2 with an UNN using 5 inner layers with linear upsampling, as well as 1 pre-output layer and 1 output layer. The convolutional operations have kernel size (4,1,1), k=4, which largely reduces the number of weights of the network. The input seed has size [4,3,1] where one column stores the location of UE2 and the others are filled with random numbers ($Z_0$).

Figure 13:
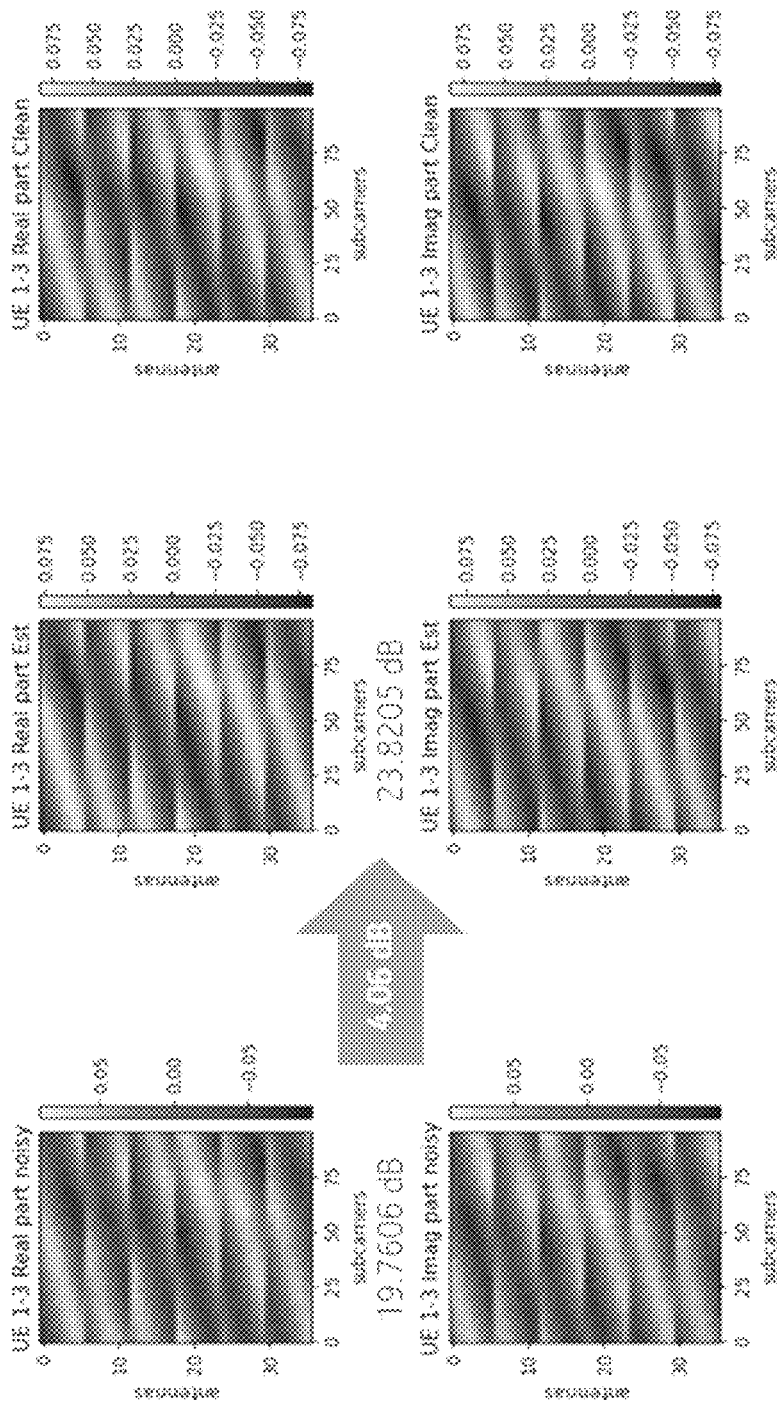
FIG. 13 shows UNN for channel reconstruction of UE 1, 2 and 3 for 96 subcarriers, 36 antennas and 1 time snapshot each. The shown channel is for UE1, the SNR values refers to all 3 UEs reconstructed channels.

In some example embodiments of the invention, UNN is used for channel reconstruction of many neighbouring UE channels. For that, we take 1 snapshot measurement for UE 1, 2 and 3 shown in FIG. 9 and design an UNN structure to recover their channels all together, that is $H_{mes}$ [36, 96, 3], with their location composing the input seed. The UNN structure is similar to the one used to obtain the results of FIG. 12, but using only 1D linear upsampling, 5 inner-layers, 1 pre-output layer and 1 output layer. However, here the convolutional kernels are of size [8, 1, 1] where k=8, and the input seed is of size [8, 3, 3] where 1 of the 3×3 matrices stores the (x,y,z) coordinates of all UEs and the others are random ($Z_0$). FIG. 13 shows the SNR result of the channel reconstruction for all the 3 UEs and plot the channel for UE 1.

Figure 14:
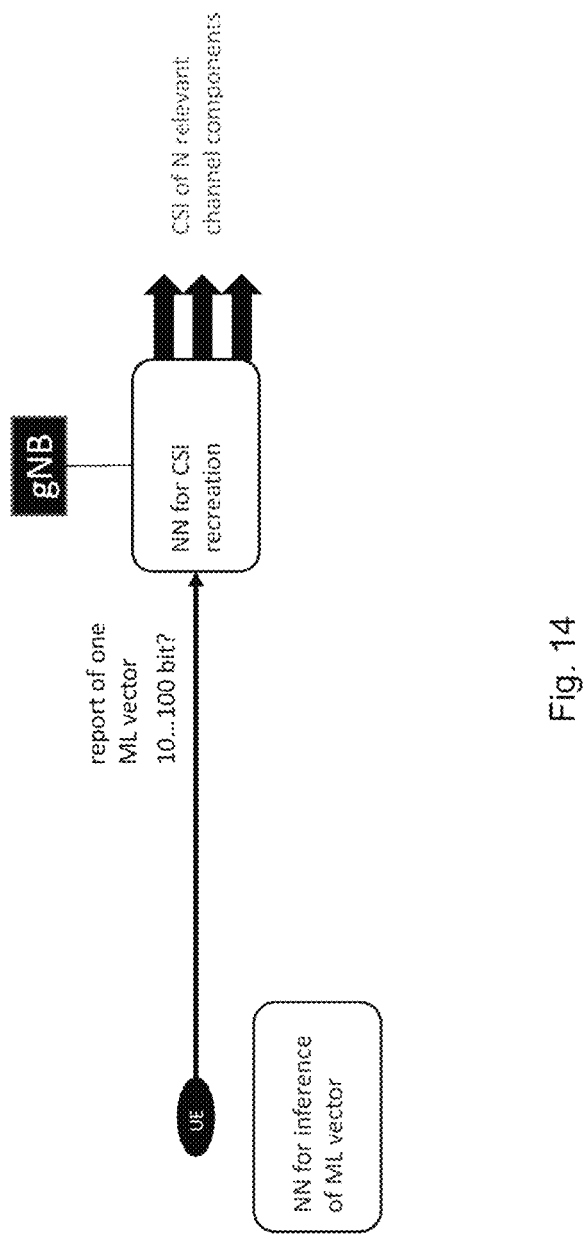
FIG. 14 illustrates a basic method for recreation of a multitude of relevant channel components.

FIG. 14 illustrates a very basic realization of a method of channel recreating for a multitude of relevant channel components according to some example embodiments of the invention. In this case, the NN is trained not only for a single UE location, but for directly providing the CSI for a certain limited area (the white area around the UE position). For that purpose, the reported ML vector length is extended and the training is done for the whole white area. The size of the white area is a design parameter and will be chosen so that it contains a high CSI correlation so that the length of the ML vector is still limited. In the end one NN for one subarea is obtained instead of NN1 to 3. Nonetheless, NN4 may still be needed to derive channels for different locations in the subarea.

In detail, for a multitude of radio channels, a multitude of UNNs are assumed, i.e., one per channel component, but ideally a single seed and/or location for all these UNNs. Then, it assumes in the more general case a certain neural network (NN) at the UE side for inference of a ML vector m, for example, of size 10 to 100 bit. The gNB uses the non linearities (ReLU activation functions) of another neural network for the recreation/inference of a predefined set of relevant channel components and inputs for that purpose the reported ML vector m. Thus, the NN is trained such it estimates the CSI for the UE-gNB link for the entire white area around the UE location. The size of the area indicates how far the CSI (represented by the neural network) used at the gNB side can be generalized relative to the UE position at the center of the white area. In addition, with increasing size of the white area, the size of the ML vector m will increase. For a certain size of the white area, the UNN structure can be reused while for larger areas, the generalization will get to its limits, i.e., in case the basic radio channel characteristics change fundamentally like LOS versus NLOS.

In that case, we propose to train different neural networks (NN) for different sub areas of the gNB environment as already illustrated in FIG. 8 for NN 1, 2 and 3. A UE in between these different sub areas will then be affected in a specific way from the channel characteristics of each of these subareas. This information is trained into the neural network NN 4, which is then inferring the best ML vector $m_{opt}$. This vector $m_{opt}$ is reported from the UE to the gNB, which has the same set of neural networks NN 1, 2 and 3. Different to neural network NN 4, it will use a ML instance NN 5 to recreate in combination with NN 1, 2 and 3 the relevant channel components. The difference between NN 4 and NN 5 is that NN 4 infers the best ML vector $m_{opt}$, while NN 5 is inferring the best fitting channel components based on $m_{opt}$. From this description it is clear that the term 'interpolation' as used above for NN 4 is somewhat misleading as the inference is much more complex than a simple (linear) interpolation. As presented earlier, NN 1, 2 and 3 can be implemented as UNN structures, while the interpolating NNs (NN 4 and NN 5) can be implemented using a combination of UNNs or general DNN methods.

Note that the recreating of the relevant channel components might be done in different ways like as the parameters of the multipath components, or, as channel transfer functions/channel impulse responses, or, in any other way. The meaning of the inferred CSI will depend on the training process, and especially on the predefined cost functions.

In the following, we describe some implementation options (example embodiments) for the above described basic concept:

Single combined NN: FIG. 15 illustrates an embodiment, where the multiple location specific neural networks NN 1, 2 and 3 are trained into a single neural network structure. In one option this might be done by fixing most of the neural network weights, with exception of the part which should cover a certain sub area of the gNB environment. After training of the sub areas, we can train on top of this the neural networks for interpolation/inference of the optimum ML vector $m_{opt}$ otherwise done by NN 4. At the gNB side, one similarly has to train NN 5 for the recreation of the CSI of the multitude of relevant channel components.

NNs for detereministic and variable CSI: FIG. 16 illustrates a further embodiment, which separates the neural networks into different instances for infering the deterministic part of the radio channels as described above plus one instance for inference of variable effects due to moving objects in the gNB area of temporary changes, like open or closed windows, etc. A third ML instance might then cover scattering effects due to rain, snow, moving leaves, etc.

Figure 17:
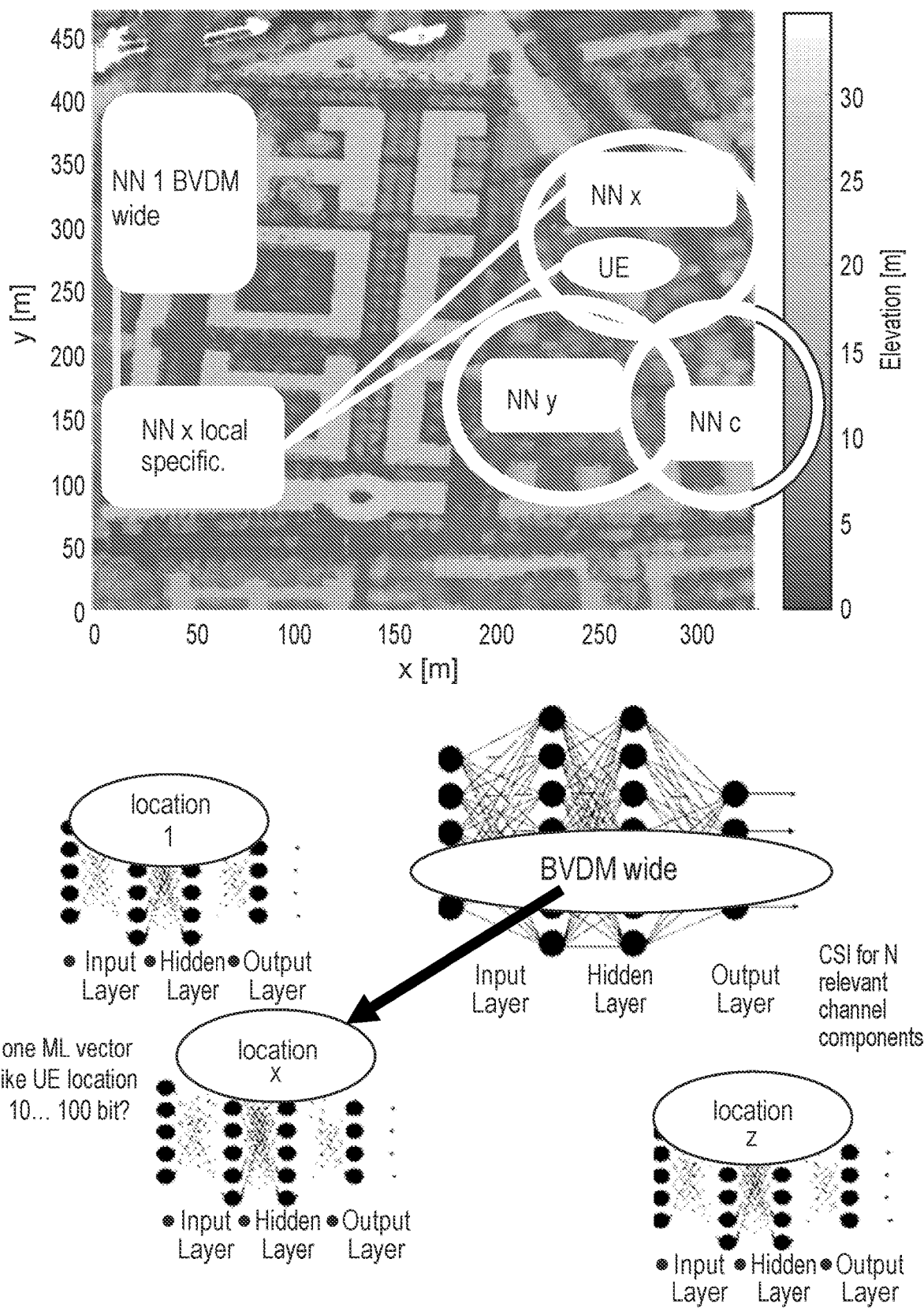
FIG. 17 illustrates a combination of one wide area neural network together with localized neural networks.

Deterministic: BVDM, TRP locations, relevant MPCs above a certain power threshold, Variable: moving objects, variations in RF-characteristics, sync-issues, BVDM variations (windows open or closed), cluster reflectors Fluctuations: moving leaves of a tree, rain, snow, scattering reflectors, Local plus wide area NN: FIG. 17 illustrates one further embodiment, where the neural network functionalities are separated into one wide area inference together with a set of local specific neural networks. This might be useful as the wide area NN might learn general scenario specific characteristics for LOS or NLOS distributions, mean or average values, # of relevant multi path components, K-factors, etc. The local specific neural networks infer the n specific localized CSI information similar as described above for the UNNs.

In some example embodiments, the flow of actions is as follows: Prior to the execution of the flowchart, gNB stores ML models. They are based on offline training, where location specific weights are obtained. For example, the training may be performed in two steps: a first step (optional) based on raytracing BVDM, and a second step based on UE feedback (full CSI reports).

In execution, gNB transmits CSI RS for antenna ports (AP) 1 to xxx. Then, gNB provides UE (knowing the hyperparameters of the NN, e.g. from unicasting, multicasting, or broadcasting, or a priori downloading) with weight sets of neural networks (e.g. NN1 to NN4) together with the respective position for which the NN with the weight set is valid. gNB may provide them either in a dedicated message to the UE, or gNB may broadcast or multicast them. Broad- or multicasting of the neural network weights and their hyper parameters might be avoided by loading a neural network library in advance. This would be similar to storing a map into a navigation tool.

Based on the CSI RS received from gNB, UE estimates CSI. Furthermore, it estimates its position, e.g. based on GPS signals, or some other positioning method.

Using these data, UE performs iterations such that the estimated measurement result $H_{est}$ fits the measurement of CSI RS $H_{mes}$ (or the derived CSI). If $H_{est}$ fits $H_{mes}$, UE obtains the ML vector $m_{opt}$, comprising the respective weights and the location of the UE (for details, see Table 1). UE reports ML vector $m_{opt}$ and side information (e.g. UE beam former information, UE orientation) to gNB. Based on the reported ML vector and the known NN (hyperparameters used in UE and gNB are the same), gNB may generate the full CSI, and precode the (mMIMO) DL signal to be transmitted to the UE.

Optionally, UE may send from time to time a full CSI. Thus, gNB may verify if the estimated full CSI is substantially correct.

FIG. 18 shows an apparatus according to an example embodiment of the invention. The apparatus may be a terminal (such as a UE or a MTC device) or an element thereof. FIG. 19 shows a method according to an example embodiment of the invention. The apparatus according to FIG. 18 may perform the method of FIG. 19 but is not limited to this method. The method of FIG. 19 may be performed by the apparatus of FIG. 18 but is not limited to being performed by this apparatus.

The apparatus comprises means for receiving 110, means for selecting 120, first means for obtaining 130, means for preparing 140, second means for obtaining 150, and means for inputting 160. The means for receiving 110, means for selecting 120, first means for obtaining 130, means for preparing 140, second means for obtaining 150, and means for inputting 160 may be a receiving means, selecting means, first obtaining means, preparing means, second obtaining means, and inputting means, respectively. The means for receiving 110, means for selecting 120, first means for obtaining 130, means for preparing 140, second means for obtaining 150, and means for inputting 160 may be a receiver, selector, first obtainer, preparer, second obtainer, and inputter, respectively. The means for receiving 110, means for selecting 120, first means for obtaining 130, means for preparing 140, second means for obtaining 150, and means for inputting 160 may be a receiving processor, selecting processor, first obtaining processor, preparing processor, second obtaining processor, and inputting processor, respectively.

The means for receiving 110 receives one or more second pairs of prior channel information and a set of weights for an interpolation neural network (S110). Each of the second pairs of prior channel information comprises a location information related to a respective prior channel from a base station and a second representation of the respective prior channel. In some example embodiments, the hyperparameters of the interpolation neural network may be predefined. In some example embodiments, the means for receiving receives additionally the hyperparameters, e.g. from broadcasting or multicasting.

The received set of weights is for a channel between a terminal and the base station. The terminal may receive the weights from the base station or from some other unit, e.g. a unit for training the interpolation NN.

The means for selecting 120 selects one or more of the second pairs of prior channel information (S120). In detail, it selects a number of second pairs of prior channel information corresponding to the number of inputs of the interpolation neural network. Hence, if the number of received second pairs of prior channel information is equal to the number of inputs of the interpolation NN, the means for selecting selects all received second pairs of prior channel information.

The first means for obtaining 130 obtains, for each of the selected second pairs of prior channel information, a respective selected first pair of prior channel information (S130). Each of the selected first pairs of prior channel information comprises the location information related to the respective prior channel and a first representation of the respective prior channel. The first representation is based on the second representation. In particular, the first representation may be the same as the second representation.

The means for preparing 140 prepares the interpolation neural network having the set of weights for the interpolation neural network (S140).

The second means for obtaining 150 obtains a terminal location information indicating a location of a terminal (S150). The terminal may be e.g. a UE or a MTC device to which the apparatus belongs. If the apparatus is a terminal, the second means for obtaining 150 obtains the location of the apparatus.

The means for inputting 160 inputs the terminal location information and the selected first pairs of prior channel information into the interpolation neural network (S160). Thus, the means for inputting 160 obtains a first estimation of a channel between the terminal and the base station as an output from the interpolation neural network.

Figure 21:
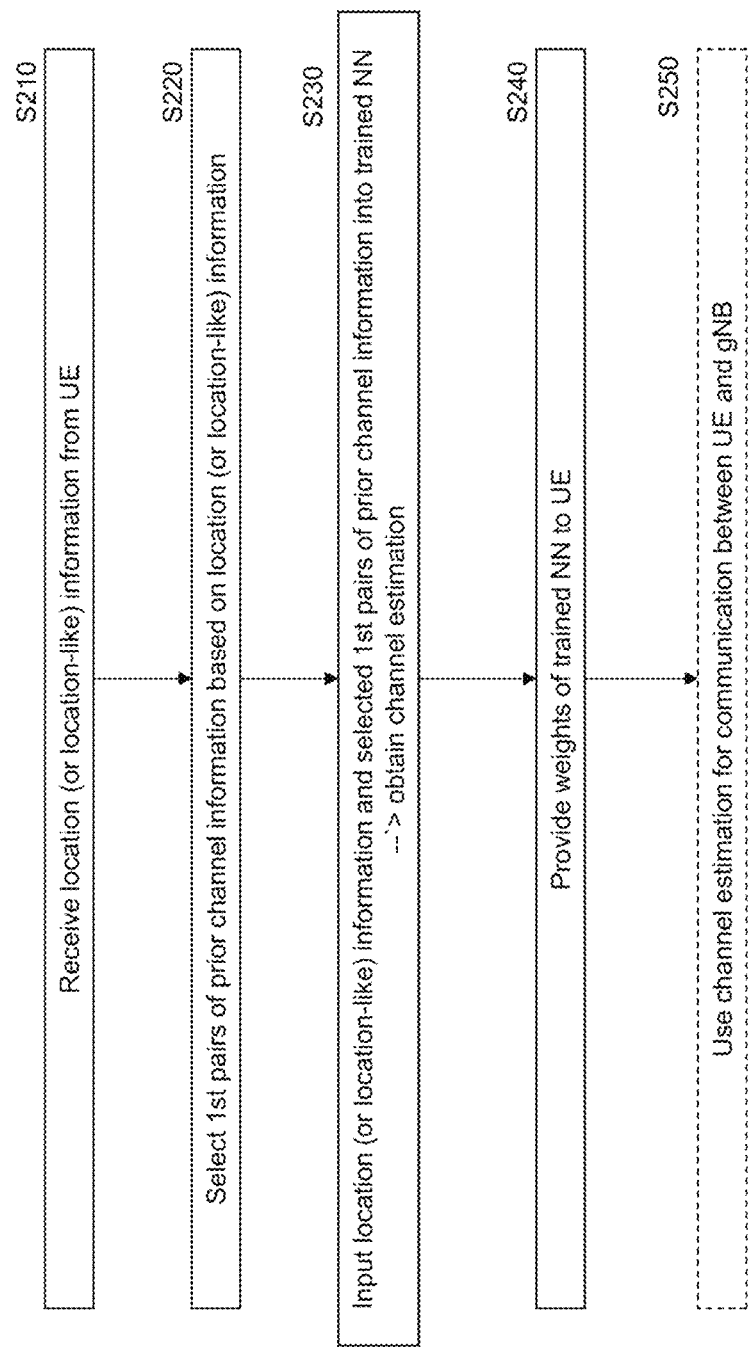
FIG. 21 shows a method according to an example embodiment of the invention.
Figure 20:
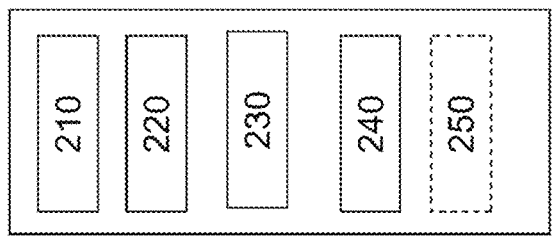
FIG. 20 shows an apparatus according to an example embodiment of the invention.

FIG. 20 shows an apparatus according to an example embodiment of the invention. The apparatus may be a base station (such as a gNB or eNB) or an element thereof. FIG. 21 shows a method according to an example embodiment of the invention. The apparatus according to FIG. 20 may perform the method of FIG. 21 but is not limited to this method. The method of FIG. 21 may be performed by the apparatus of FIG. 20 but is not limited to being performed by this apparatus.

The apparatus comprises means for receiving 210, means for selecting 220, means for inputting 230, means for providing 240, and (optionally) means for using 250. The means for receiving 210, means for selecting 220, means for inputting 230, means for providing 240, and means for using may be a receiving means, selecting means, inputting means, providing means, and using means, respectively. The means for receiving 210, means for selecting 220, means for inputting 230, means for providing 240, and means for using 250 may be a receiver, selector, inputter, provider, and user, respectively. The means for receiving 210, means for selecting 220, means for inputting 230, means for providing 240, and using means 250 may be a receiving processor, selecting processor, inputting processor, providing processor, and using processor, respectively.

The means for receiving 210 receives a terminal location information or a location-like information from a terminal, such as a UE or a MTC device (S210). The means for selecting 220 selects one or more first pairs of prior channel information among stored one or more first pairs of prior channel information (S220). The selection is made based on the terminal location information or the location-like information, respectively. Each of the one or more first pairs of prior channel information comprises a location information related to a respective prior channel and a first representation of the respective prior channel.

The means for inputting 230 inputs the terminal location information or the location-like information, respectively, and the selected one or more first pairs of prior channel information into a trained interpolation neural network (S230). Thus, the means for inputting 230 obtains a first estimation of a channel between the terminal and a base station as an output from the interpolation neural network. The apparatus may belong to the base station, or the apparatus may be the base station.

The means for providing 240 provides the weights of the trained neural network to the terminal (S240). In addition, depending on implementation, the means for providing 240 may provide an indication of the selected one or more first pairs of prior channel information to the terminal. For example, the means for providing 240 may provide the selected one or more first pairs of prior channel information as the "indication". As another example, if the first pairs of channel information are already available at the terminal, the indication may be just an index to the selected first pairs of channel information. If the terminal knows the selection algorithm used by the apparatus and the first pairs of channel information are already available at the terminal, the apparatus may not provide any indication of the selected one or more first pairs of prior channel information to the terminal.

If the apparatus comprises the means for using 250, the means for using 250 uses the first estimation of the channel between the terminal and the base station for controlling a communication between the terminal and the base station (S250). For example, the means for using 250 may use the first estimation for precoding, link adaptation, and/or scheduling.

Figure 22:
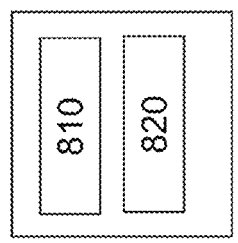
FIG. 22 shows an apparatus according to an example embodiment of the invention.

FIG. 22 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least the method according to at least one of FIGS. 19 and 21 and related description.

The numbers of time snapshots and subcarriers used in the simulation, and the number of involved gNBs are to be seen as examples only and may be adapted to the needs.

Some example embodiments are explained with respect to a 5G network. However, the invention is not limited to 5G. It may be used in other radio networks, too, e.g. in previous of forthcoming generations of 3GPP networks such as 4G, 6G, or 7G, etc. It may be used in non-3GPP networks where a channel estimation is employed.

Some example embodiments of the invention are described where the artificial intelligence is based on machine learning. However, the invention is not limited to ML. It may be applied to other kinds of artificial intelligence.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

In the present application and, in particular, the claims, the expressions "first [entity]" and "second [entity]" have to be read that the entities may be the same or different from each other, unless it is explicitly stated or made clear from the context that only one of these options applies.

According to the above description, it should thus be apparent that example embodiments of the present invention provide, for example, a terminal (such as a UE or a MTC device) or a component thereof, an apparatus embodying the same, a method for controlling and/or operating the same, and computer program(s) controlling and/or operating the same as well as mediums carrying such computer program (s) and forming computer program product(s). According to the above description, it should thus be apparent that example embodiments of the present invention provide, for example, a base station (such as a gNB or eNB) or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The invention claimed is:

1. A method, comprising:
  receiving one or more second pairs of prior channel information, wherein each of the second pairs of prior channel information comprises a location information related to a respective prior channel from a base station and a second representation of the respective prior channel;
  selecting one or more of the second pairs of prior channel information;
  for each of the selected second pairs of prior channel information: obtaining a respective selected first pair of prior channel information, wherein each of the selected first pairs of prior channel information comprises the location information related to the respective prior channel and a first representation of the respective prior channel, and the first representation is based on the second representation;
  receiving, for a channel between a terminal and the base station, a set of weights for an interpolation neural network;
  preparing the interpolation neural network having the set of weights for the interpolation neural network;
  obtaining a terminal location information indicating a location of the terminal; and
  inputting the terminal location information and the selected first pairs of prior channel information into the interpolation neural network to obtain a first estimation of the channel between the terminal and the base station as an output from the interpolation neural network.

2. The method according to claim 1, further comprising:
  providing the terminal location information to the base station; and
  using the first estimation of the channel between the terminal and the base station for controlling a communication between the terminal and the base station.

3. The method according to claim 1, further comprising:
  obtaining a second estimation of the channel between the terminal and the base station from a measurement of the channel between the terminal and the base station;
  receiving, for the channel between the terminal and the base station, a set of finetuning weights;
  preparing a finetuning neural network having the set of finetuning weights;
  inputting a pair of the terminal location information and the first estimation of the channel between the terminal and the base station and a pair of the terminal location information and the second estimation of the channel between the terminal and the base station into the finetuning neural network to obtain a location-like information as an output of the finetuning neural network;
  providing the location-like information to the base station; and
  using the second estimation of the channel between the terminal and the base station for controlling a communication between the terminal and the base station.

4. The method according to claim 1, wherein for at least one of the one or more second pairs of information:

the second representation comprises respective weights of an prior channel neural network;

the first representation is obtained by inputting the location information related to the respective prior channel into the prior channel neural network having the respective weights.

5. A method, comprising:

receiving a terminal location information or a location-like information from a terminal;

selecting one or more first pairs of prior channel information among one or more stored first pairs of prior channel information based on the terminal location information or the location-like information, respectively;

inputting the terminal location information or the location-like information, respectively, and the selected one or more first pairs of prior channel information into a trained interpolation neural network to obtain a first estimation of a channel between the terminal and a base station as an output from the interpolation neural network; and providing the weights of the trained neural network to the terminal; wherein each of the one or more first pairs of prior channel information comprises a location information related to a respective prior channel and a first representation of the respective prior channel.

6. The method according to claim 5, further comprising:

using the first estimation of the channel between the terminal and the base station for controlling a communication between the terminal and the base station.

7. The method according to claim 5, wherein for each of the one or more first pairs:

the respective first pair of prior channel information is stored; and/or the respective first pair of prior channel information is obtained from a stored second representation of the respective prior channel;

the second representation of the respective prior channel comprises respective weights of a prior channel neural network;

the first representation of the respective prior channel is obtained by inputting the respective location information related to the respective prior channel into the prior channel neural network having the respective weights.

8. The method according to claim 7, further comprising for each of the one or more first pairs of information:

receiving the location information related to the respective prior channel and a measurement of the respective prior channel from a prior channel terminal, wherein the respective prior channel is between the prior channel terminal and the base station;

inputting a seed into the prior channel neural network, wherein the seed comprises the location information related to the respective prior channel; and adapting respective weights of the prior channel neural network, into which the seed is input, such that a respective output of the prior channel neural network is close to the measurement of the respective prior channel according to a first cost function;

wherein the respective output of the prior channel neural network is the first representation of the respective prior channel; and the respective weights of the prior channel neural network when the respective output of the prior channel neural network is close to the measurement of the respective prior channel are the second representation of the respective prior channel.

9. The method according to claim 8, further comprising:

receiving plural training pairs, wherein each of the training pairs comprises a respective training location information and a respective training channel estimation;

inputting the plural training pairs and the selected first pairs of prior channel information into a neural network; and adapting the weights of the neural network such that a second cost function is minimized; wherein the second cost function is selected such that for each of the selected first pairs of prior channel information: if the location information related to the respective prior channel is input into the trained neural network, the output of the trained neural network differs from the measurement of the respective prior channel by not more than a stored threshold value, or, is at least as close as possible to the measurement for the given neural network.

10. The method of claim 9, wherein the trained neural network is obtained when the weights are adapted such that the second cost function is minimized.

11. The method of claim 9, further comprising:

generating, for at least one of the training pairs, a respective distorted pair, wherein the distorted pair is generated by adding a value of a predefined noise to at least one of the respective training location information and the respective training channel estimation;

inputting the plural training pairs and the at least one distorted pair into the neural network;

adapting the weights of the neural network such that the second cost function is minimized to obtain the trained neural network.

12. The method according to claim 5, further comprising:

providing an indication of the selected one or more first pairs of prior channel information to the terminal.

13. The method according to claim 12, further comprising:

providing the selected one or more first pairs of prior channel information to the terminal as the indication.

14. An apparatus, comprising:

one or more processors, and memory storing instructions that, when executed by the one or more processors, cause the apparatus to perform the method according to claim 1.

15. A non-transitory computer readable medium comprising program instructions which, when executed on an apparatus, cause the apparatus to carry out the method according to claim 1.

* * * * *